United States Patent
Hsu et al.

(10) Patent No.: US 12,344,765 B2
(45) Date of Patent: Jul. 1, 2025

(54) ICEPHOBIC SURFACES AND METHODS OF PRODUCING THE SAME

(71) Applicant: The George Washington University, Washington, DC (US)

(72) Inventors: Stephen Hsu, Germantown, MD (US); Govindaiah Patakamuri, Ashburn, VA (US)

(73) Assignee: THE GEORGE WASHINGTON UNIVERSITY, Washington, DC (US)

( * ) Notice: Subject to any disclaimer, the term of this patent is extended or adjusted under 35 U.S.C. 154(b) by 70 days.

(21) Appl. No.: 18/019,714

(22) PCT Filed: Aug. 11, 2021

(86) PCT No.: PCT/US2021/045550
§ 371 (c)(1),
(2) Date: Feb. 3, 2023

(87) PCT Pub. No.: WO2022/035964
PCT Pub. Date: Feb. 17, 2022

(65) Prior Publication Data
US 2024/0209220 A1   Jun. 27, 2024

Related U.S. Application Data

(60) Provisional application No. 63/064,145, filed on Aug. 11, 2020.

(51) Int. Cl.
| | | |
|---|---|---|
| C09D 183/04 | (2006.01) | |
| C09D 5/16 | (2006.01) | |
| C09D 7/40 | (2018.01) | |

(Continued)

(52) U.S. Cl.
CPC ............. *C09D 5/1681* (2013.01); *C09D 7/62* (2018.01); *C09D 7/67* (2018.01); *C09D 7/68* (2018.01);

(Continued)

(58) Field of Classification Search
CPC .. B60H 1/3205; B60H 1/3211; B60H 1/3216; B60H 2001/325; B60H 2001/3252;

(Continued)

(56) References Cited

U.S. PATENT DOCUMENTS 9,353,646 B2  5/2016  Aizenberg et al.
9,840,631 B2  12/2017 Yuan et al.

(Continued)

FOREIGN PATENT DOCUMENTS

CN      105199457 A       12/2015
WO      WO-2019/190706 A2  10/2019

OTHER PUBLICATIONS

International Search Report and Written Opinion for PCT/US2021/045550 dated Nov. 22, 2021, 14 pages.

(Continued)

*Primary Examiner* — Lawrence D Ferguson
(74) *Attorney, Agent, or Firm* — Blank Rome LLP

(57) ABSTRACT

An icephobic substrate includes a base substrate and an icephobic coating on a first surface of the base substrate, the icephobic coating comprising nanoparticles on the first surface of the substrate, carbon nanotubes bound to the nanoparticles, and fluorinated polyhedral oligomeric silsesquioxane (POSS) compounds impregnated into and/or onto the carbon nanotubes, wherein the icephobic substrate has a plurality of flowpaths for the movement of solids and/or liquids relative to the icephobic coating.

29 Claims, 15 Drawing Sheets

(51) Int. Cl.
*C09D 7/62* (2018.01)
*C08G 77/04* (2006.01)
*C08G 77/24* (2006.01)

(52) U.S. Cl.
CPC ......... *C09D 183/04* (2013.01); *C08G 77/045* (2013.01); *C08G 77/24* (2013.01)

(58) Field of Classification Search
CPC .... B60H 2001/3261; B60H 2001/3275; F04B 2027/1813; F04B 2027/1827; F04B 2027/1854; F04B 27/1804; F25B 31/004; F25B 41/335; F25B 49/022; C08G 77/045; C08G 77/24; C08K 3/041; C08K 3/36; C09D 183/04; C09D 5/1681; C09D 7/62; C09D 7/67; C09D 7/68
See application file for complete search history.

(56) References Cited

U.S. PATENT DOCUMENTS

| | | |
|---|---|---|
| 2010/0126981 A1 | 5/2010 | Heintz et al. |
| 2010/0314575 A1 | 12/2010 | Gao et al. |
| 2017/0107413 A1 | 4/2017 | Wang et al. |
| 2017/0218209 A1 | 8/2017 | Yuan et al. |
| 2017/0253761 A1 | 9/2017 | Nowak et al. |
| 2018/0127616 A1 | 5/2018 | Tuteja et al. |
| 2018/0230972 A1 | 8/2018 | Martinez Goitandia et al. |
| 2020/0180826 A1 | 6/2020 | Richter et al. |

OTHER PUBLICATIONS

A. E. Hacioglu, "Design and Fabrication of Ice-phobic Surfaces", Ann Arbor: ProQuest, 2019, p. 28-32 and 45-46.

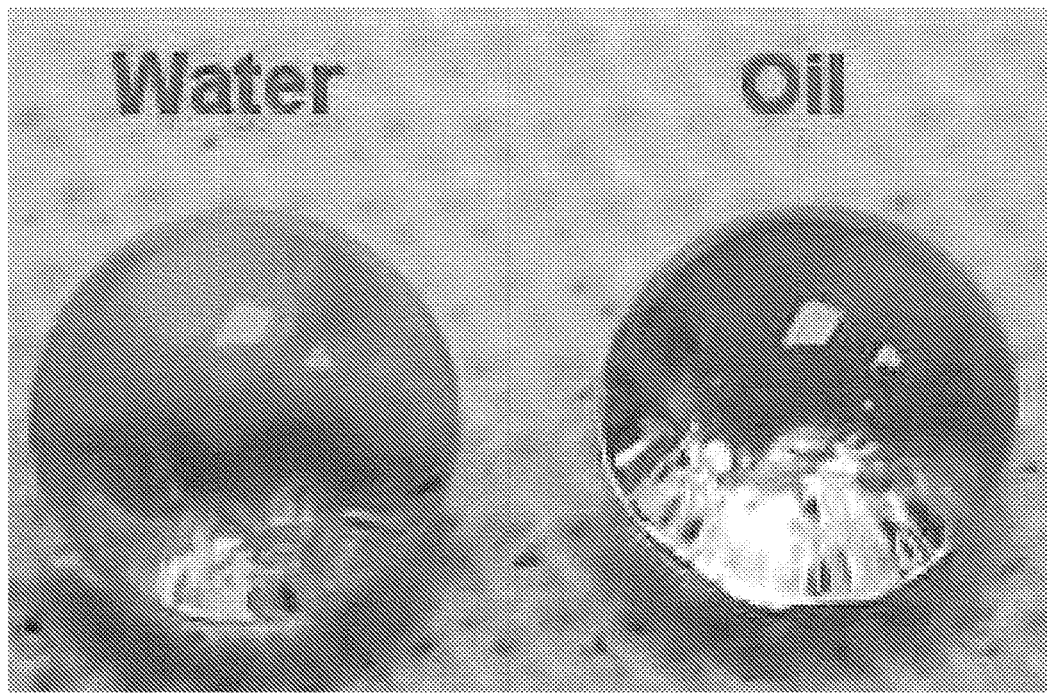
FIG. 16
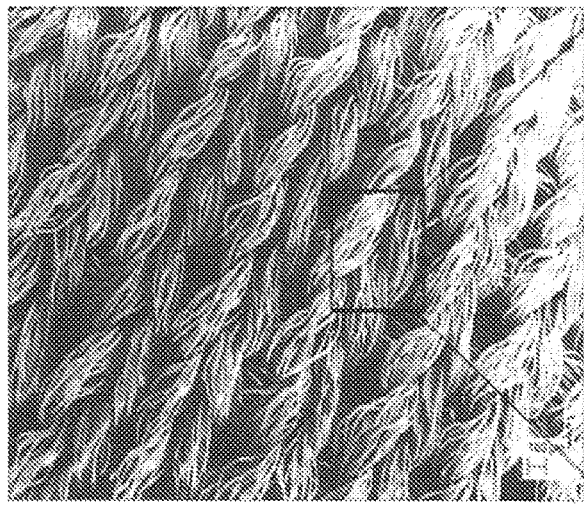 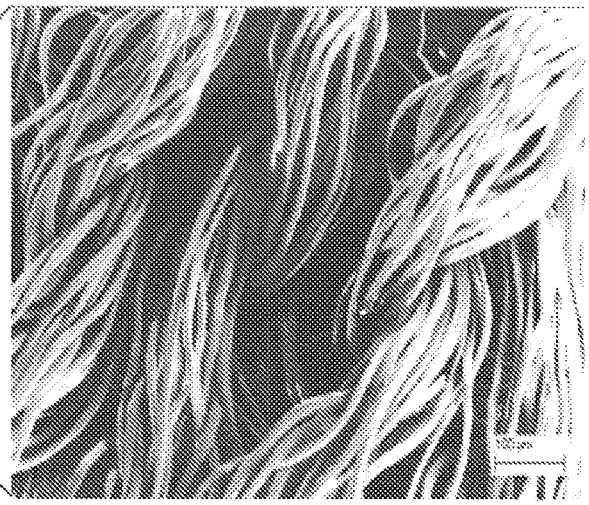
FIG. 17A  FIG. 17B

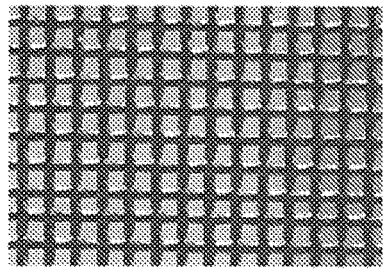
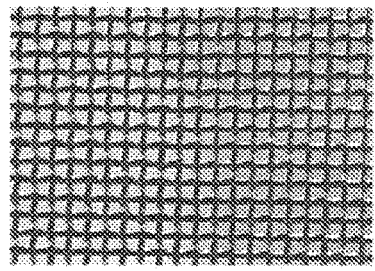
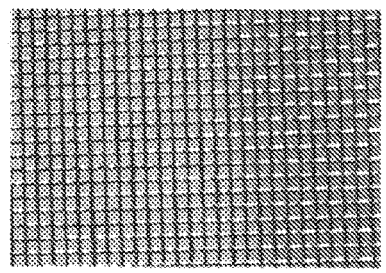
FIG. 18A      FIG. 18B      FIG. 18C
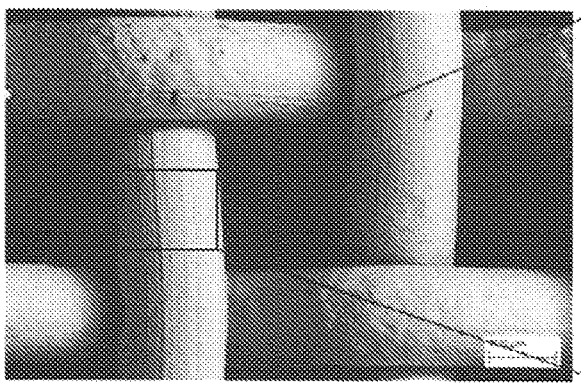
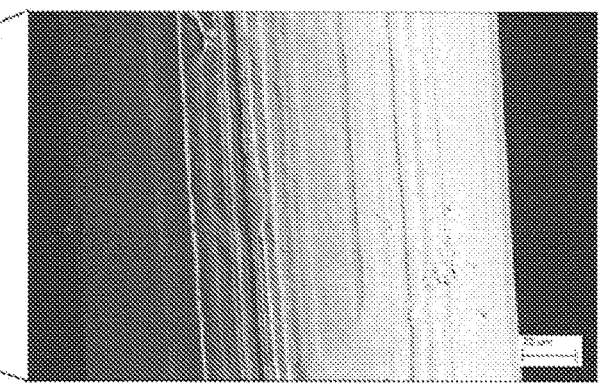
FIG. 18D      FIG. 18E
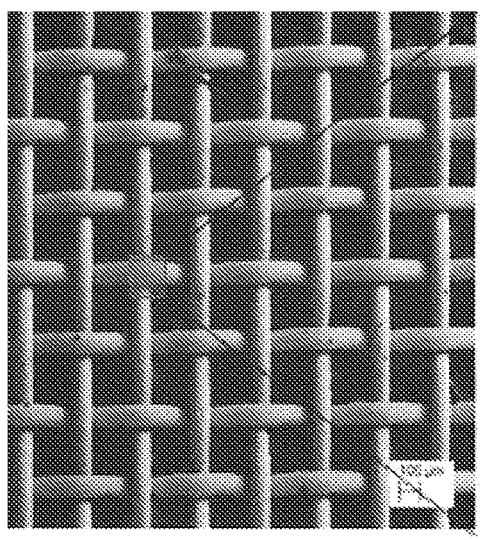
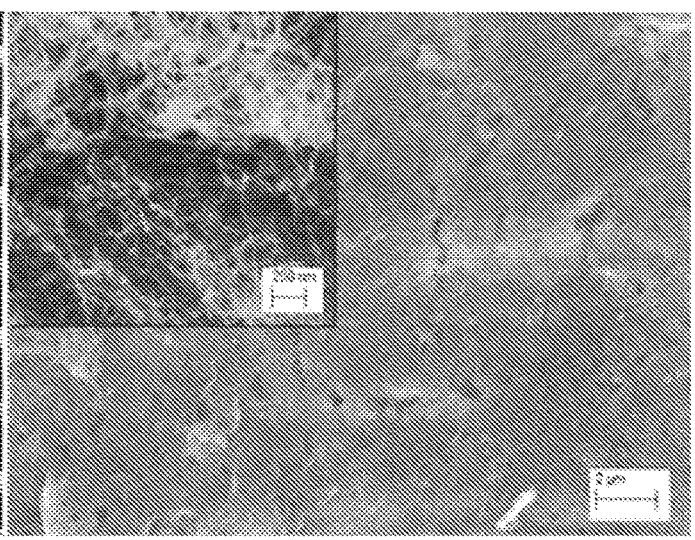
FIG. 19A      FIG. 19B

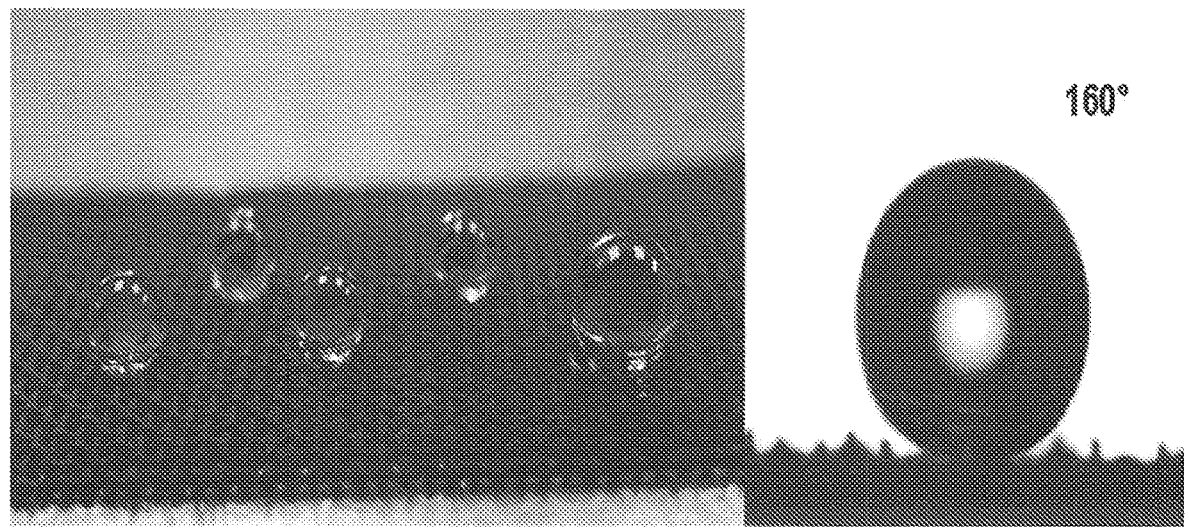
FIG. 20A  FIG. 20B
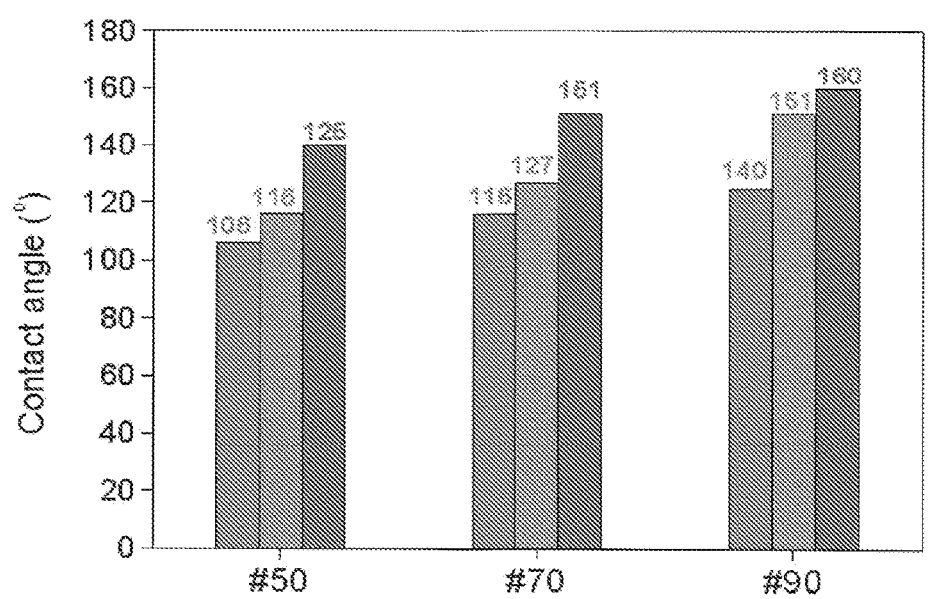
FIG. 21

ICEPHOBIC SURFACES AND METHODS OF PRODUCING THE SAME

RELATED APPLICATIONS

This application is a national phase of PCT/US2021/045550, filed on Aug. 11, 2021, which claims the benefit of U.S. Provisional Patent Application No. 63/064,145, filed on Aug. 11, 2020. The contents of these applications are hereby incorporated by reference in their entirety.

FIELD OF THE INVENTION

The present invention relates to icephobic surfaces and methods for producing said icephobic surfaces.

BACKGROUND OF THE DISCLOSURE

An icephobic surface is a surface that can repel ice or a surface onto which it is difficult for ice to form. An icephobic surface can also be a surface where any ice formed thereon can be removed easier than otherwise similar untreated/coated surfaces. An icephobic surface, however, is not necessarily an "ice-free" surface under all weather conditions.

Icephobicity has three key application areas: cargo ships, for example external surfaces and safety equipment, that traverse freezing environments such as the Northern Sea Route (through Arctic Seas); sub-space stations for the Space Force; and aerospace applications such as for the prevention of airplane wing ice accretion. Each of these three application areas have their own special needs and specifications. There is additional need for icephobic protection in power lines, towers, wind turbine blades, solar panels, water piping, television antennae and dishes, and so on. In some of these applications, however, icephobic surfaces for each may also have specific requirements.

Currently there are many commercial products (for example, coatings, surface treatments, sprays, paints, and materials) being marketed as "icephobic". Most of them are hydrophobic or ultra-hydrophobic, with surface designs based on wetting theory. Surface wetting can be defined as the ability of a liquid to maintain contact with a solid surface, resulting from intermolecular interactions when the two are brought together. The degree of wetting (wettability) is determined by a force balance between adhesive and cohesive forces. Thus, under wetting theory, if a surface can be modified such that intermolecular interactions with said surface and water can be disrupted, the water roll or jump off the surface and ice will have difficulty forming on said surface. In real applications, the icing potential driven by temperature difference and humidity differentials will cause rapid freezing.

In the Arctic Sea, the air temperatures are commonly between −20° C. to −30° C., with a continuous supply of sea water through bow splashes, wind gust-enhanced wind chill, and occasionally continuous snow or ice storms. Additionally, air moisture can, under a certain conditions, directly sublime into ice (frost) without going through the liquid phase. In such instances, icephobic surfaces based on the wetting theory would fail to provide icephobic properties.

Ice is water in crystalline form. Snow is one of the many examples of crystalline water. The formation of ice is controlled by nucleation, which requires a solid particle to act as a nucleation seed to form an ice crystal. Crystals then link together and form a sheet on the surface depending on temperatures, humidity, pressure, etc. Then, ice crystallization propagation processes take over and the ice grows. For icephobicity, inhibiting ice nucleation is a path forward but on earth solid particles are everywhere, so this path is difficult. The other path is to disrupt the ice crystallization propagation kinetics/processes. Additionally, polar insects or animals also produce anti-freeze proteins that can prevent ice crystallization to protect tissues to survive cold temperatures, but this effect is temporary, will only affect small local areas to protect vital organs and will not prevent ice accretion, burying the insect.

Ice formation has many pathways besides the normal freezing mechanisms. One such pathway is condensation freezing, where moisture in the air condenses on very cold surfaces. Another pathway is the frost mechanism, where moisture bypasses the liquid phase instead sublimes into ice. In the Arctic Sea, the air temperatures at night range can range from −20° C. to −30° C., so the tendency to form ice is high. For sailing through the Arctic, the major source of ice is from sea spray splashing. In addition, the Artic is known to have ice storms, where ice crystals rain down on surfaces. Surfaces designed based on wetting theory are generally insufficient in preventing ice accretion.

First generation icephobic coatings, made prior to 2010, are primarily based on polyurethane, or other polymeric materials mixed with Teflon (PTFE or polytetrafluoroethylene) or other fluoropolymers, or covered by a PTFE coating. The icephobicity of these first generation coatings is derived from the resulting non-wetting fluorinated surface. The advantage of such coatings are surface robustness, they can withstand normal hand contact and cleaning processes, and they can make ice removal easier since adhesion of ice with PTFE surfaces is low. But these first generation coatings do not stop ice formation and accretion.

Second generation icephobic surfaces can be exemplified by US 2010/0314575 by Gao et al. In Gao et al., 5-30 nm diameter silica nanoparticles and silane molecules are used to create ice nucleation barriers. The nanoparticles are then mixed with a polymer binder for easy application onto a surface. Other patent applications directed to second generation icephobic surfaces also use nanoparticles or microlithography to create air traps and pillars on the surface to achieve water repellency and icephobicity. These disclosures did not touch on the durability of the resulting icephobic surface or the effect of repeated freeze-thaw cycle-induced stresses on the surface superstructures.

Following the introduction of the use of nanoparticles towards the production of icephobic surfaces, various further icephobic technology developments were pursued.

U.S. Pat. No. 9,353,646 by Aizenberg et al. is directed to self-healing, slippery liquid-infused porous surfaces. Porous surfaces were fabricated by surface machining techniques, and pore cavities were filled with lubricants, which can migrate back to surface contact areas to effect self-repairing.

U.S. Pat. No. 9,840,631 by Yuan is directed to a theoretical discussion on the possible optimization of a preparation method for a fluorinated POSS/polysiloxane hybrid coating for anti-ice coatings. The patent focuses on various polymer chemistries and their combination with fluorinated polymers to achieve coatings with small wrinkles. Yuan provides no anti-icing experimental data.

US 2017/0253761 by Nowak is directed to the use of three particles mixed with polymers, forming a polymer matrix composite coating that demonstrates icing delays of 20-500 seconds. The technology is primarily intended for airplane wing icing resistance.

Some patent applications, such as US 2018/0127616 and WO 2019/190706, both by Tuteja et al., focus on low adhesion interfaces to remove ice formed on surfaces. Tuteja et al. describe the use of an elastomeric polymer with a low crosslink density (e.g. ≤ 1,300 mol/m³) and low initial ice adhesion strength (e.g., $\tau_{ice}$≤ 100 kPa prior to exposure to icing conditions). To facilitate ice removal, the coating should have low interfacial toughness less than or equal to 1 J/m². Polymers used by Tuteja et al. to make icephobic surfaces are polydimethylsiloxane (PDMS) and polymethylhydrosiloxane (PMHS) with perfluoropolyether (PFPE). Tuteja et al. focused on mechanical property optimization.

Some patent applications, such as US 2018/0230972 by Goitanda et al. and WO 2020/180826A1 by Sushant et al., are directed to the use of phase change materials (PCMs) to provide heat to delay icing. Goitanda et al. blends PCMs into either paint or a coating on wind turbine blades to prevent ice accumulation on the leading edge of said blades. Goitanda et al. forms silica microcapsules using sol-gel technology (inorganic microcapsules). However, Goitanda et al. only uses paraffins as the PCM in solid inorganic microcapsules for paint applications, showing in a simple Peltier apparatus and in an environmental chamber, and delaying ice formation in the range of 20-30 minutes.

Sushant et al. is directed methods for inhibiting ice formation on surfaces, reducing contact line pinning at water-solid interfaces, inhibiting water transition from vapor to solid states (de-sublimation), and decreasing adhesion of substances to surfaces. In Sushant et al., one or more PCMs are applied to a surface, where the PCMs have melting points above surface ice formation temperatures. Sushant et al. appears to use the PCMs directly on surfaces and examines freezing delays under frosting conditions as long as the PCMs can provide sufficient latent heat to melt or delay the freezing under carefully controlled frosting conditions.

Most icephobic surface designs based on nanoparticles or sophisticated surface machining (CMOS, Semiconductor processing to shape silicon wafer surface to create systematic structures such as pillars, caves, superstructures) require the use of nanofabrication facilities, which are expensive to use. Application of icephobic surface technology to cargo ships, even for critical instrument and safety related parts, entail large irregular surfaces, and such rough irregular surfaces cannot be processed using surface machining.

For some critical instruments such as antenna, satellite links, and communication gears, once the ship leaves port, any repair and replacement would have to be performed locally by the crew. So, the cost of fabrication needs to be cheap and easily replaceable during voyage.

BRIEF DESCRIPTION OF THE DRAWINGS

FIG. 16 is a photograph showing a cloth surface, treated with CNT-functionalized silica nanoparticles (also referred to herein as SiO₂ NP-MWCNT conjugates) and fluorinated polyhedral oligomeric silsesquioxane (POSS) compounds, exhibits omniphobic characteristics towards both water (left) and oil (right).

FIG. 17A is an SEM image of a dust-cleaning cloth using plastic fibers.

FIG. 17B is an SEM image of plastic fiber bundles of the dust-cleaning cloth of FIG. 17A.

FIGS. 18A-C are photographs of steel mesh #50 (FIG. 18A), steel mesh #70 (FIG. 18B) and steel mesh #90 (FIG. 18C), each with untreated surfaces.

FIG. 18D is an SEM image of individual wires of a steel wire mesh with an untreated surface.

FIG. 18E is an SEM image of the surface of a single wire of the individuals wire of the steel mesh of FIG. 18D.

FIG. 19A is an SEM image of a steel mesh surface modified with CNT-functionalized silica nanoparticles (also referred to herein as $SiO_2$ NP-MWCNT conjugates) and fluorinated POSS.

FIG. 19B shows SEM images with 2 µm and 200 nm scale bars, respectively, showing steel mesh surfaces modified with CNT-functionalized silica nanoparticles and fluorinated POSS of FIG. 19A.

FIG. 20A is a photograph showing water droplets on the steel mesh surface modified with CNT-functionalized silica nanoparticles and fluorinated POSS of FIG. 19A.

FIG. 20B is a photograph showing a single water droplet of FIG. 20A having a measured contact angle of 160°.

FIG. 21 is a bar graph showing the influence of the mesh size on water contact angle. The graph more specifically shows water contact angles for untreated, POSS treated, and CNT-functionalized silica nanoparticles and POSS treated steel mesh #50, steel mesh #70 and steel mesh #90. For each dataset, the untreated steel mesh is the left data bar, the POSS-treated steel mesh is the middle data bar and the CNT-functionalized silica nanoparticles and POSS treated steel mesh is the right data bar.

DETAILED DESCRIPTION

Figure 1:
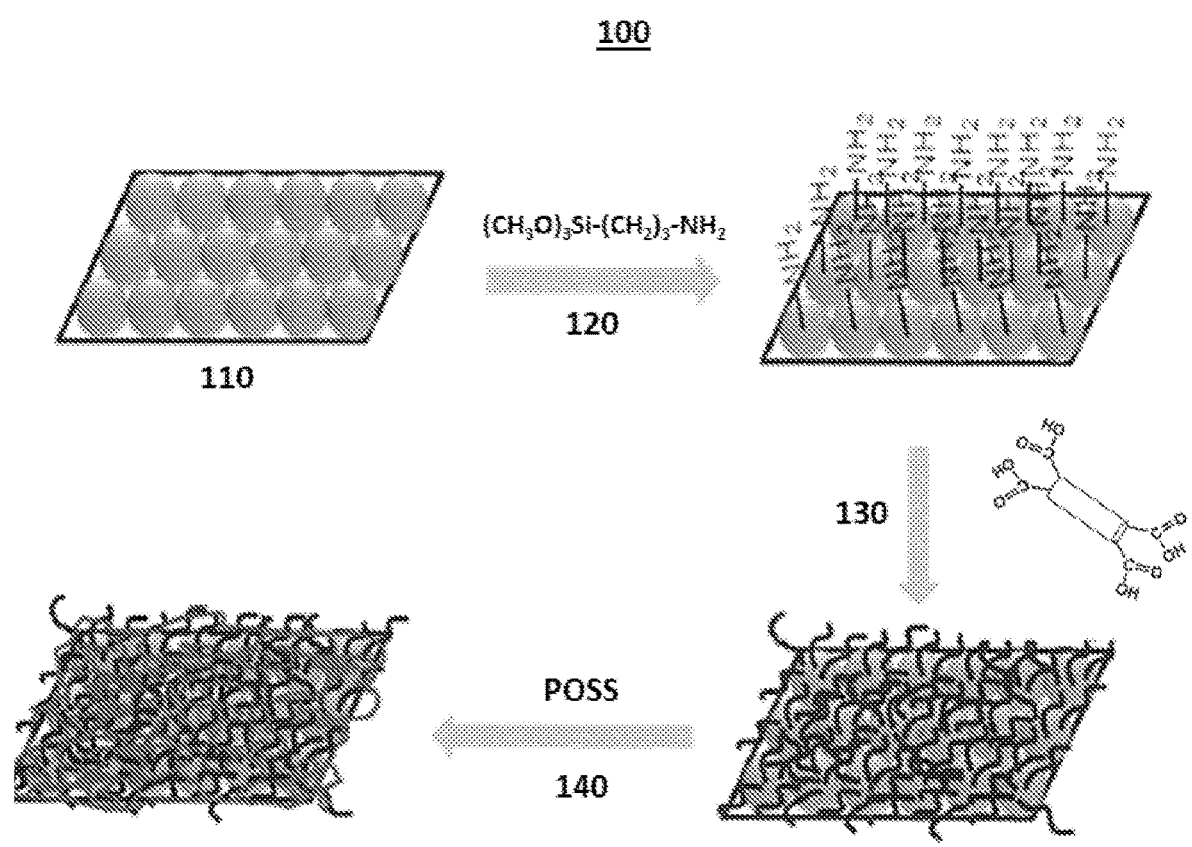
FIG. 1 is a schematic diagram illustrating an exemplary method for the fabrication of an icephobic substrate according to various aspects of the disclosure.

The following description of the embodiments is merely exemplary in nature and is in no way intended to limit the subject matter of the present disclosure, their application, or uses.

As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The lack of clear definition and measurement standards make the term "icephobic" unclear; it could mean an ice-free surface or a surface where ice can be removed with less force when compared to an otherwise similar untreated surface. Based on our research results, we classify icephobic surfaces into three categories: 1) ice-free surfaces; 2) surfaces that exhibit a delay in ice formation for up to 2 hours; and 3) surfaces that exhibit a delay in ice formation for up to 10 hours, when measured under specific standard environmental test conditions.

According to various aspects of the disclosure, we have designed and constructed several state-of-the-art unique instruments to measure icing delay and ice accretion. First, we have developed a Cryogenic Differential Scanning calorimeter (C-DSC) capable of measuring the heat of enthalpy of fusion from room temperature to −80° C. We have also developed a Cryogenic Simultaneous DSC/Thermogravimetric Analyzer (CS-DSC/TGA) capable of quantitatively measuring water accumulation and freezing on the sample surfaces from room temperature to −80° C. in a controlled environment. We have also developed an All-Weather Simulation Chamber equipped with four sample weighting stations to measure ice accretion under several weather simulations such as rain, snow, freezing rain, with variable wind gusts, with an operational temperature range from room temperature to −50° C. Through the use of these instruments, we are able to quantitatively measure ice accretion, ice accretion rates on various surfaces, icing delay time, the effect of wind gust, and humidity. As discussed above, because icephobic surfaces lack clear definition, direct comparison of efficacy of prior art compositions and methods is difficult. Without standard equipment and standard conditions, the effectiveness of icephobic surfaces of the prior art cannot be verified and compared. With the availability of these new instruments, standard measurements at standard conditions can be used to classify the degree of icephobicity specific to desired applications. Presently, we envision two broad classification categories: ice-free surfaces for a specific time at a specific conditions, and ice accretion reduction as compared to baseline (untreated surface) after certain time under a set of standard conditions.

According to various aspects of the disclosure, ultra-high surface energy icephobic surfaces are prepared. Such ultra-high surface icephobic energy surfaces are designed to prevent adherence of, and instead drive away, liquid droplets (such as, for example, oils, water, saltwater solutions, and other aqueous solutions). Such ultra-high surface icephobic energy surfaces are also designed to prevent adherence of, and instead drive away, solid particles (such as, for example, ice crystals). Specifically, icephobic surfaces prepared according to various aspects of the disclosure have been found to delay ice formation thereon for periods of over 100 hours or higher under controlled conditions, which inventors believe has not been accomplished by others date. Such ultra-high surface energy icephobic surfaces are also designed to be mechanically robust and resilient to withstand repeated freeze-thaw cycle volume expansion stresses of 8.3% on the surface superstructure.

Icephobic substrates according to various aspects of the disclosure exhibit surface superstructures that are resilient and capable of withstanding in excess of 21 continuous freeze-thaw cycles without damage. In the final project report from the Euro "Iceage, 2015", many prior art nanoparticle-based icephobic surfaces, while performed well in laboratory, failed to perform when subjected to repeated freeze-thaw cycles on the slopes of Alps. We tested the freeze-thaw cycles 21 times as an experiment to study the stochastic nature of ice nucleation. The design of the icephobic substrate surfaces according to the disclosure are a improvement over prior art substrates, at least in part, due to the use of multi-wall carbon nanotubes (MWCNTs) to form molecular "bushes" with fluorinated POSS compounds (alternatively referred to herein as molecules) decorated within the pores of and/or the surface of the MWCNTs. During the freeze-thaw cycles, the ice-water transition cycles create expansion-contraction stress cycles (ice is 8.3% less dense than water). Most prior art surface surface designs crack and lose their icephobic properties over repetitive freeze-thaw cycles. Icephobic substrates according to this disclosure avoid such damage due to flexible structures and recover from the volume change without damage. Based on the experimental data and theory, we project that the Icephobic substrates described herein are durable for numerous freeze-thaw cycles.

Icephobic substrate surface designs according to various aspects of the present disclosure exhibit a combination of physical and chemical properties that cumulatively result in high icephobicity. First, the substrate surfaces exhibit multiscale high energy surface topographies, from molecular to nanometer to millimeter scales and beyond, which disrupt ice nucleation processes and repel solid particles and small ice crystals from landing and staying on the surface. Second, the substrate surfaces exhibit built-in multiscale voids or "caves" ranging from molecular sizes (using, for example, fluorinated POSS cages), to nanometer sizes (using, for example, microcrystalline materials obtained via oxidation of substrate surfaces, to millimeter or centimeter sizes (via, for example, disordered macroscopic substrate surface texturing) to trap ice crystals of various sizes to disrupt ice crystallization processes and delay the formation of continuous surface ice crystal layers. Third, the formation of substrate surfaces with disordered macroscopic texturing creates a surface topography having multiscale watersheds, which promotes the movement of liquid/ice particles relative to the substrate surface (i.e., the sliding, rolling, etc. of liquid/ice particles on substrate surfaces). Fourth, the addition of fluorinated POSS cages on substrate surfaces imparts said surfaces with ultrahydrophobic and/or omniphobic properties to prevent liquid wetting mechanisms.

FIG. 1 is a schematic diagram illustrating an exemplary method 100 for the fabrication of an icephobic substrate according to various aspects of the present disclosure. The schematic diagram of exemplary method 100 is illustrative in nature and one of ordinary skill in the art will appreciate that more steps may be added with imparting from the scope of the method.

In step 110, a substrate is provided. The substrate is preferably planar or substantially planar and solid (i.e., non-porous) or substantially solid. In step 110, a monolayer of nanoparticles is applied to the surface of the substrate. Then subsequent monolayers are applied in sequence to build a pillared nanoparticle structure. The pillared nanoparticle structure is prepared using a series of reactively inert stencils (for example, PDMS soft mask) that control placement of the nanoparticles relative to the immediately underlying layer. The nanoparticle monolayers layers are generally deposited using a self-assembly process overnight at room temperature in a class 100 clean room environment. In some instances, the number of subsequent monolayers is between 1 and 10. In some instances, the number of subsequent monolayers is between 2 and 8. In some instances, the number of subsequent monolayers is between 3 and 6. In some instances, the number of subsequent monolayers is between 4 or 5. In practice, each monolayer deposition becomes more difficult because the resulting surface tends to reconfigure itself if the resulting configuration is thermodynamically unstable. As such, the optimum number of nanoparticle monolayers generally tends to be four or five layers. To monolayers are applied in such a fashion that the resulting pillared nanoparticle structure exhibits a plurality of hills and valleys, which preferably form an overall disoriented topography. To minimize stacking spaces, progressively smaller nanoparticles can be used as the monolayer level increases.

The types of substrates and nanoparticles that may be used in accordance with various aspects of method 100 are described below. When silica particles are used, they will bond to each other during fabrication of the monolayers via hydrolysis and the resulting 3D structures are mechanically strong and robust. One embodiment of this invention is to create robust icephobic surface based on naturally occurred phenomena such as the presence of watersheds to allow easy rolling of liquids or solids (usually with a molecular layer of water molecules), similar to the natural landscape when continents are formed from tectonic plate collision. Based on this model, we used multilayer self-assembled layer by layer of nanoparticles to create surface hills and valleys by depositing monolayers of nanoparticles (e.g., silicate or any solid nanoparticles) using self-assembled monolayer technique. After the first monolayer has been deposited, the subsequent deposition of nanoparticles will add the particles at specific locations using a polymeric mask to control the creation of hills and valleys on the silicon wafer.

In step 120, the top monolayer of nanoparticles are reacted with a compound that provides the nanoparticles with reactive functional groups. In the schematic of method 100, the nanoparticles are made of silicon dioxide and the compound is 3-aminopropyltrimethoxy silane. As discussed below, however, the types of nanoparticles and compounds can be varied to result in different types of ligand-functionalized nanoparticles.

In step 130, the top monolayer of ligand-functionalized nanoparticles are reacted with ligand-functionalized carbon nanotubes (CNTs) such that the CNTs are physically or chemically, preferably chemically, bound to the nanoparticles. The CNTs resemble a plurality of "brushes" or "whiskers" on the surface of the substrate. CNTs that may be used in accordance with various aspects of method 100 are described below.

In step 140, CNTs-functionalized substrate is wetted with a fluorocarbon or carbonfluorocarbon solvent and subsequently reacted with a fluorinated polyhedral oligomeric silsesquioxane (POSS). Fluorinated POSSs that may be used in accordance with various aspects of method 100 are described below. The fluorinated POSS is impregnated into the pores of and/or onto the external walls of the CNTs. The after POSS impregnation, the resulting icephobic substrate is allowed to anneal overnight at a controlled temperature in an inert atmosphere such as nitrogen or argon, preferably argon. As one of ordinary skill in the art will appreciate, the annealing temperature will depend on the molecular weight of the fluorinated POSS, and the boiling point of solvent. At this stage, the icephobic surface fabrication is complete.

Figure 2:
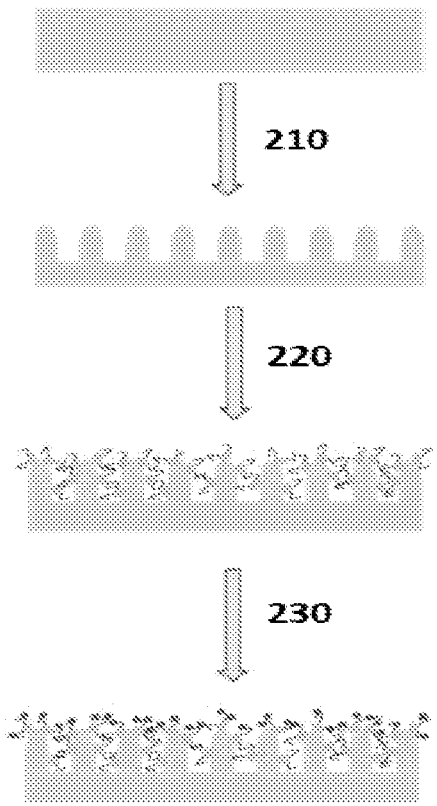
FIG. 2 is a schematic diagram illustrating another exemplary method for the fabrication of an icephobic substrate according to various aspects of the disclosure.

FIG. 2 is a schematic diagram illustrating an exemplary method 200 for the fabrication of an icephobic substrate according to various aspects of the present disclosure. The schematic diagram of exemplary method 200 is illustrative in nature and one of ordinary skill in the art will appreciate that more steps may be added with imparting from the scope of the method.

In step 210, a substrate is provided. In some instances, the substrate is solid (i.e., non-porous) or substantially solid. In some instances, suitable substrates can be in the form of a sheet having a substantially planar surface. In some instances, suitable substrates can be in the form of a sheet having a curved surface. In some instances, suitable substrates can exhibit essentially solid or non-porous surfaces. In some instances, suitable substrates can be rigid. In some instances, suitable substrates can be flexible. Examples of suitable solid substrates for use in step 210 of method 200 are described below.

In step 210, the substrate is chemically and/or physically modified to provide the substrate with a textured surface. When the substrate is made of a glass or ceramic, a metal or alloy, or a polymer or rubber, the substrate surface is physically or chemically textured in a such a manner that the surface exhibits a network of randomly oriented (or disoriented) hills and valleys having varied heights, widths and/or lengths. Physical texturing methods include, but are not limited to crumpling, roughening, axially compressing, grinding, cutting and laser etching. Chemical texturing methods include, but are not limited to etching and oxidizing. For example, when the substrate is made of a metal or metal alloy, the substrate surface may be subjected to hydrothermal or chemical oxidation reactions to convert at least a portion of the substrate surface to have nano- and/or microcrystalline metal oxides of different sizes and/or crystal particle orientations relative to the substrate surface, creating sharp or jagged peaks and valleys or wells on the substrate surface.

Figure 3:
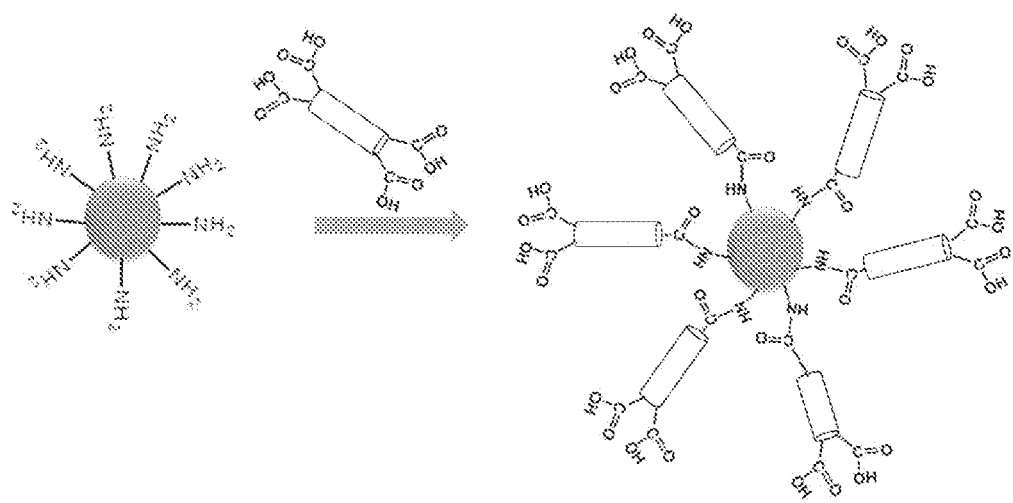
FIG. 3 is a schematic illustration of the formation of carbon nanotube (CNT)-functionalized silica nanoparticles (also referred to herein as NP-CNT conjugates) according to various aspects of the disclosure.

In step 220, the textured substrate surface is reacted with nanoparticle-CNT conjugates to deposit the nanoparticle-CNT conjugates on the hills and valleys of the textured substrate surface. A representative reaction scheme for the synthesis of nanoparticle-CNT conjugates is shown in FIG. 3, where a reaction between the primary amine of the 3-aminopropyl ligands of silicon dioxide nanoparticles is reacted with carboxylic acid groups on CNTs to form an amide bond therebetween. As discussed below, the types of nanoparticles can be varied to result in different types of nanoparticle-CNT conjugates.

In step 230, nanoparticle-CNT conjugate-functionalized substrate is wetted with a fluorocarbon or carbonfluorocarbon solvent and subsequently reacted with a fluorinated polyhedral oligomeric silsesquioxane (POSS). Fluorinated POSSs that may be used in accordance with various aspects of method 200 are described below. The fluorinated POSS is impregnated into the pores of and/or onto the external walls of the CNTs. The after POSS impregnation, the resulting icephobic substrate is allowed to anneal overnight at a controlled temperature in an inert atmosphere such as nitrogen or argon, preferably argon. As one of ordinary skill in the art will appreciate, the annealing temperature will depend on the molecular weight of the fluorinated POSS, and the boiling point of solvent. At this stage, the icephobic surface fabrication is complete.

In the schematic illustration of FIG. 2, the initial substrate in step 210 is solid or essentially solid. When the initial substrate is textured in its original form, such as when the substrate is, for example, a metal or alloy mesh, woven or non-woven fibers, or a woven or non-woven fabric, step 210 may be omitted and method 200 can instead begin at step 220.

Substrates

The methodologies provided herein can be applied to a broad range of substrates. In some instances, suitable substrates can be in the form of a sheet having a substantially planar surface. In some instances, suitable substrates can be in the form of a sheet having a curved surface. surface. In some instances, suitable substrates can exhibit essentially solid or non-porous surfaces. In some instances, suitable substrates can be rigid. In some instances, suitable substrates can be flexible. In some instances, suitable substrates can exhibit porous surfaces such as, for example, metal or alloy meshes. In some instances, suitable substrates can be woven or non-woven fibers. In some instances, suitable substrates can be woven or non-woven fabrics.

In some instances, suitable substrates can exhibit essentially solid or non-porous surfaces. Examples of solid or non-porous surfaces include, but are not limited to, external automobile, aeronautical and/or railcar surfaces, windows, walls, floors, ship hulls, guard rails, satellite dishes, wire coatings (for example, power lines), piping, wind turbine blades, solar panels, and so on.

Suitable substrates can be made from a broad range of materials including, but not limited to, silicon, glasses and ceramics, metals and metal alloys (for example, aluminum, steel, copper, bronze, and brass), metal oxides, carbon fiber, PTFE fiber, plastics and rubbers, animal-derived textiles, plant-derived textiles, synthetic textiles and any combination thereof.

As discussed above, surfaces according to the present disclosure exhibit a combination of physical and chemical properties that cumulatively result in high icephobicity. The degree of icephobicity of surfaces according to the present disclosure is imparted partially by the presence of substrate surfaces having 1) multiscale high energy surface topographies to disrupt ice nucleation processes and repels solid particles and small ice crystals from landing and staying on the surface, 2) built-in multiscale voids or "caves" to trap ice crystals of various sizes to disrupt ice crystallization processes and delay the formation of continuous surface ice crystal layers, and 3) disordered macroscopic texturing that creates a surface topography having multiscale watersheds, which promotes to movement of liquid/ice particles relative to the substrate surface. Various methodologies may be utilized to achieve properties 1)-3). As used herein, the term "multiscale" means having various features of varying lengths, widths and/or heights ranging from nanometers to centimeters.

When the substrate exhibits essentially solid or non-porous surfaces, chemical and/or physical modifications can be made to the substrate surface to achieve properties 1)-3)

above. Additionally or alternatively, when the substrate is made of a glass or ceramic, a metal or alloy, or a polymer or rubber, the substrate surface can be physically or chemically textured in a such a manner that the surface exhibits a network of randomly oriented (or disoriented) hills and valleys having varied heights, widths and/or lengths. Physical texturing methods include, but are not limited to scratching, indenting, crumpling, roughening, axially compressing, grinding, cutting and laser etching. Chemical texturing methods include, but are not limited to wet chemical, electrochemical etching and oxidizing. For example, when the substrate is made of a metal or metal alloy, the substrate surface may be subjected to hydrothermal or chemical oxidation reactions to convert at least a portion of the substrate surface to have nano- and/or microcrystalline metal oxides of different sizes and/or crystal particle orientations relative to the substrate surface, creating sharp or jagged peaks and valleys or wells on the substrate surface. Such a transformation provides a low-cost fabrication method to create nanometer- and/or micrometer-scale roughened surfaces, with predictable uniformity and energy profiles, without the use of expensive nanofabrication facilities.

Other embodiments of this invention include the use of various materials and in combination with various geometric shapes and forms to enhance the effectiveness of icephobic surfaces. We found the use of fibers (PTFE, carbon, and polymer fibers), woven fibers, glass tube or rods, cloths, steel sieves, woven cloths, when used as substrates, enhance icephobicity by introducing high curvatures at controlled length scales. This confirms our concept that steep slopes and wrinkles may enhance icephobicity. By themselves, icephobic surfaces using fibers, tubes, and other materials can be suitable to enhance icephobicity in different situations and requirements. According to various aspects of the disclosure, the use of small diameter fibers including each individual materials (plastics, steel mesh, glass fibers of various diameters, PTFE fibers, carbon fibers, and their mixtures woven together to form rigid and/or flexible surfaces) are effective starting substrates for the formation of icephobic surfaces, as described herein, for various applications.

Nanoparticles

The type of nanoparticles used in accordance with various aspects of the disclosure is not particularly limiting. Any nanoparticles that can be physically and chemically adsorbed onto substrate surfaces and can be functionalized with reactive ligands for coupling with ligand-functionalized CNTs, can be used. Nanoparticles used in accordance with various aspects of the present disclosures can have average hydrodynamic diameters ranging from about 5 nm to about 250 nm. In some instances, nanoparticles having average hydrodynamic diameters ranging from about 5 nm to about 150 nm, alternatively from about 5 nm to about 100 nm, alternatively from about 5 nm to about 90 nm, alternatively from about 5 nm to about 80 nm, alternatively from about 5 nm to about 70 nm, alternatively from about 5 nm to about 60 nm, alternatively from about 5 nm to about 50 nm, alternatively from about 5 nm to about 40 nm, alternatively from about 5 nm to about 30 nm, alternatively from about 5 nm to about 20 nm, alternatively from about 5 nm to about 15 nm, and alternatively from about 8 nm to about 12 nm can be used. In some instances, the nanoparticles can be made of a metal, a metal alloy, or a metal oxide. In some instances, the nanoparticles can be made of a glass or a ceramic. In some instances, the nanoparticles can be may of a polymer such as, for example, polytetrafluoroethylene (PTFE), polystyrene (PS), polymethyl methacrylate (PMMA), polyethylene (PE), polyethylene terephthalate (PET), polypropylene (PP), polyamide (PA), polyurethane (PU), polyvinyl alcohol (PVOH), and polyvinyl acetate (PVAc). In some instances, the nanoparticle as silica nanoparticles.

The nanoparticles can be functionalized with any suitable reactive group that allows for physical and/or chemical adsorption onto substrate surfaces and with ligand-functionalized CNTs. Suitable reactive groups include, but are not limited to, alcohols, acrylates, acyl halides, aldehydes, alkenes, alkynes, amides, amines, azides, carboxylates, carboxylic acids, cyanates, disulfides, dithiocarboxylic acids, epoxides, esters, ethers, haloalkanes, imides, imines, ketones, nitrate, nitriles, nitosyls, sulfides, sulfinic acids, sulfones, sulfonic acids, sulfonic esters, sulfoxides, thials, thiocyanates, thioesters, and thiols.

When silica nanoparticles are used, surface silanols of the silica nanoparticles can be reacted, via a hydrolysis and condensation reaction, with alkoxy groups of an alkoxysilane compound to provide the silica nanoparticles with ligands having reactive functional groups, for subsequent binding to ligand-functionalized CNTs.

In some instances, amine-functionalized silica nanoparticles can be prepared by reaction with alkoxysilanes such as, for example, 11-aminoundecyltriethoxysilane, 3-aminopropyltrimethoxysilane, 3-aminopropyldimethylmethoxysilane, 3-aminopropylmethyldiethoxysilane, 3-aminopropyltriethoxysilane, 3-aminopropyldimethylethoxysilane, 3-aminopropyldisopropylmethoxysilane, N-3-[(amino(polypropylenoxy)]aminopropyltrimethoxysilane, 4-aminobutyltriethoxysilane, 4-amino-3,3-dimethylbutylmethyldimethoxysilane, 4-amino-3,3-dimethylbutyltrimethoxysilane, 1-amino-2-(dimethylethoxysilyl)propane, N-(2-aminoethyl)-3-aminoisobutyldimethylmethoxysilane, N-(2-aminoethyl)-3-aminoisobutylmethyldimethoxysilane, N-(2-aminoethyl)-3-aminopropylmethyldiethoxysilane, N-(2-aminoethyl)-3-aminopropylmethyldimethoxysilane, N-(2-aminoethyl)-3-aminopropyltriethoxysilane, N-(2-aminoethyl)-3-aminopropyltrimethoxysilane, N-(6-aminohexyl)aminomethyltriethoxysilane, N-(6-aminohexyl)aminopropyltrimethoxysilane, N-(2-aminoethyl)-11-aminoundecyltrimethoxysilane, 3-[2-(2-aminoethylamino)ethylamino]propyltrimethoxysilane, and 3,3'-bis(trimethoxysilyl)dipropylamine, [3-(methylamino)propyl]trimethoxysilane.

In some instances, amide-functionalized silica nanoparticles can be prepared by reaction with alkoxysilanes such as, for example, 1-[3-(trimethoxysilyl)propyl]urea, and (3-acetamidopropyl)trimethoxysilane.

In some instances, isocyanate-functionalized silica nanoparticles can be prepared by reaction with alkoxysilanes such as, for example, (3-isocyanatopropyl)trimethoxysilane.

In some instances, haloalkane-functionalized silica nanoparticles can be prepared by reaction with alkoxysilanes such as, for example, (3-chloropropyl)triethoxysilane, (3-iodopropyl)trimethoxysilane, and (3-bromopropyl)trimethoxysilane.

In some instances, acrylate-functionalized silica nanoparticles can be prepared by reaction with alkoxysilanes such as, for example, 3-(trimethoxysilyl)propyl acrylate, 3-acrylamidopropyltrimethoxysilane, N-(3-acryloxy-2-hydroxypropyl)-3-aminopropyltriethoxysilane, and acryloxymethyltrimethoxysilane.

In some instances, thiol-functionalized silica nanoparticles can be prepared by reaction with alkoxysilanes such as, for example, (3-mercaptopropyl)triethoxysilane, (3-mercaptopropyl)trimethoxysilane, and (3-mercaptopropyl)methyldimethoxysilane.

In some instances, epoxide-functionalized silica nanoparticles can be prepared by reaction with alkoxysilanes such as, for example, (3-glycidyloxypropyl)triethoxysilane, (3-glycidyloxypropyl)trimethoxysilane, 2-(3,4-epoxycyclohexyl)ethyltrimethoxysilane, trimethoxy[2-(7-oxabicyclo[4.1.0]heptan-3-yl)ethyl]silane, triethoxy[2-(7-oxabicyclo[4.1.0]hept-3-yl)ethyl]silane.

In some instances, vinyl-functionalized silica nanoparticles can be prepared by reaction with alkoxysilanes such as, for example, dimethoxymethylvinylsilane, allyltrimethoxysilane, allyltriethoxysilane, (7-Octen-1-yl)trimethoxysilane, 3-(N-allylamino)propyltrimethoxysilane, allylaminotrimethoxysilane, allyltriethoxysilane, and allyltrimethoxysilane.

In some instances, nitrile-functionalized silica nanoparticles can be prepared by reaction with alkoxysilanes such as, for example, 3-cyanopropyltriethoxysilane, and (2-cyanoethyl)triethoxysilane.

In some instances, azide-functionalized silica nanoparticles can be prepared by reaction with alkoxysilanes such as, for example, 3-azidopropyltrimethoxysilane, 3-azidopropyltriethoxysilane, and 11-azidoundecylyltrimethoxysilane.

Ligand-Functionalized Carbon Nanotubes

One of the unique aspects of this invention is the attachment carbon nanotubes to substrate surfaces. In some instances, the carbon nanotubes can be single-walled carbon nanotubes (SWCNTs). In some instances, the carbon nanotubes can be multi-walled carbon nanotubes (MWCNTs). The CNTs can average lengths ranging from nanometers to centimeters and nanometer scale pore diameters. The CNTs preferably have a certain amount of impurities such as, for example, iron, aluminum, nickel, and cobalt organometallics on their surfaces that provide active sites for functionalization of CNT surfaces and/or edges with ligands having reactive groups amenable to reaction with functional groups provided on nanoparticles (described above) to form nanoparticle-CNT conjugates. In some instances, the CNTs are composed of at least about 5 wt % total impurities, alternatively at least about 10 wt % total impurities, alternatively at least about 15 wt % total impurities, alternatively at least about 20 wt % total impurities, alternatively at least about 25 wt % total impurities, and alternatively up to about 30 wt % total impurities. The type of reactive group is not particularly limiting. Suitable reactive groups include, but are not limited to, alcohols, acrylates, acyl halides, aldehydes, alkenes, alkynes, amides, amines, azides, carboxylates, carboxylic acids, cyanates, disulfides, dithiocarboxylic acids, epoxides, esters, ethers, haloalkanes, imides, imines, ketones, nitrate, nitriles, nitosyls, sulfides, sulfinic acids, sulfones, sulfonic acids, sulfonic esters, sulfoxides, thials, thiocyanates, thioesters, and thiols.

Fluorinated Polyhedral Oligomeric Silsesquioxanes (POSS)

Polyhedral oligomeric silsesquioxanes (POSS) are organosilicon compounds with the chemical formula $[RSiO_{3/2}]_n$, where R=H, alkyl, aryl or alkoxyl and n generally equals 6, 8, 10 or 12. POSS compounds exhibit cage-like structures with Si—O—Si linkages and tetrahedral silicon vertices bound to three oxygen molecules and one R group. Fluorinated POSS compounds have the chemical formula $[RSiO_{3/2}]_n$, where R is a fluorocarbon and n generally equals 6, 8, 10 or 12 Fluorinated POSS compounds according to various aspects of the disclosure can be synthesized via a hydrolysis and condensation reaction of trialkoxyfluorocarbons according to scheme (1)

$$n\ RSi(OR')_3 + 1.5n\ H_2O \rightarrow [RSiO_{3/2}]_n + 3n\ R'OH \quad (1)$$

wherein
n = 6, 8, 10 or 12
R = fluorocarbon
R' = methyl, ethyl, tertbutyl

Preferably, n is 8.

Figure 4:
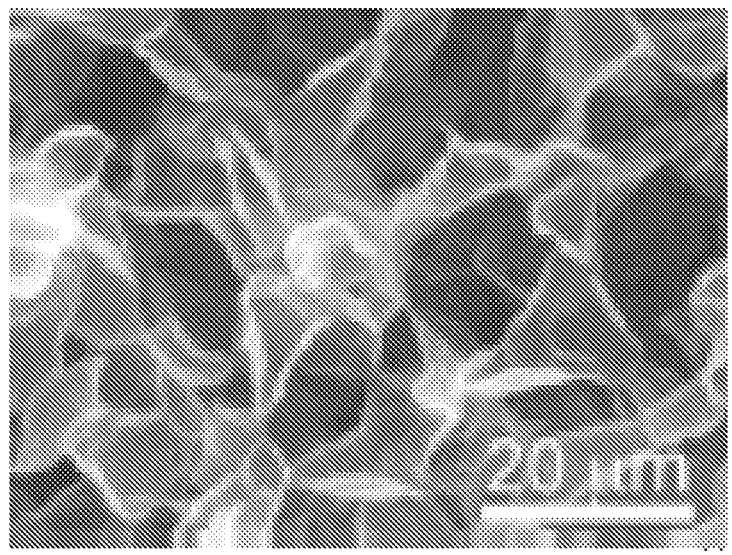
FIG. 4 is an SEM image of a fluorinated polyhedral oligomeric silsesquioxane (POSS) compound according to various aspects of the disclosure.

Suitable trialkoxyfluorocarbons (i.e., $RSi(OR')_3$) for the synthesis of fluorinated POSS compounds include, but are not limited to, (trifluoromethyl)trimethoxysilane, perfluorododecyltriethoxysilane, perfluorodecyltriethoxysilane, perfluorotetradecyltriethoxysilane, (tridecafluoro-1,1,2,2-tetrahydrooctyl)triethoxysilane, (4-perfluorooctylphenyl)triethoxysilane, pentafluorophenyltriethoxysilane, pentafluorophenyltrimethoxysilane, (p-trifluoromethyltetrafluorophenyl)triethoxysilane, nonafluorohexyltriethoxysilane, nonafluorohexyltrimethoxysilane, (heptadecafluoro-1,1,2,2-tetrahydrodecyl)trimethoxysilane, (heptadecafluoro-1,1,2,2-tetrahydrodecyl)triethoxysilane. In a preferred embodiment, the use of eight equivalents (n=8) of perfluorodecyltriethoxysilane produces a fluorinated POSS molecule having a density of 2.1 g/cm³, and melting point ranging from about 120-140° C. and a molecular weight of 3994 g/mol. Such a fluorinated POSS molecule is shown in the SEM image of FIG. 4 and exhibits a cage-like structure.

Fluorinated Solvents

During the fabrication of icephobic substrates, fluorinated solvents can be used in accordance with various aspects of the disclosure to wet substrate surfaces to facilitate subsequent incorporation of fluorinate POSS compounds. Suitable fluorinated solvents include, but are not limited to, perfluorooctane, perfluoronane, tetradecafluorohexane, hexadecafluorohexane, perfluorotetracosane, tetradecafluoro-2-methylpentane, hexafluorobenzene, octafluorotoluene, perfluoro(allylbenzene), dodecafluorodimethylcyclobutane, perfluoro(methylcyclohexane), perfluoro-2-methyl-2-pentene, perfluoro(1,3-dimethylcyclohexane), perfluoro(methylcyclopentane), 1,1,1,2,3,4,4,5,5,5-decafluoropentane, 3,3-dichloro-1,1,1,2,2-pentafluoropropane, 1,3-dichloro-1,1,2,2,3-pentafluoropropane, 1,1,2,2,9,9,10,10-octafluoro-p-cyclophane, 2,3-dichlorooctafluorobutane, heptafluoro-2,3,3-trichlorobutane, 1,8-dichloroperfluorooctane, and any combination thereof.

Applications

Icephobic substrates according to various aspects of the disclosure can be used in various applications.

For example, in a first general embodiment, icephobic substrates according to various aspects of the present disclosure can be fabricated an used as-is without further modification. For example, icephobic substrates made from mesh materials can be used without further modification as, for example, filter screens or netting. Also for example, icephobic substrates made from woven or nonwoven fabrics or fibers can be used without further modification as, for example, various textiles. Also for example, icephobic substrates made from solid or nonporous materials can be used without further modification as, for example, walls, roofing, flooring, antennae, satellite dishes and so on.

Also for example, in a second general embodiment, icephobic substrates according to various aspects of the present disclosure can be used in various applications in the form of an adhesive tape, wherein a first side of the icephobic substrate has the NP-CNT conjugates and fluorinated POSS compounds and a second side, opposite the first side, of the icephobic substrate is coated with an adhesive for bonding the icephobic substrate to and end-use product (for example, walls, roofing, flooring, antennae, satellite dishes and so on).

Also for example, in a third general embodiment, icephobic substrates according to various aspects of the present disclosure can be used in various applications in the form of an icephobic substrate with an underlying heating element, wherein a first side of the icephobic substrate has the NP-CNT conjugates and fluorinated POSS compounds and a second side, opposite the first side, is coupled with a heating element. In some instances, the heating element can comprise a layer having one or more phase change materials (PCMs). In some instances, the heating element can comprise a layer having microcapsules with one or more phase change materials (PCMs) encapsulated therein.

As described elsewhere herein, ice nucleation requires a specific thermal energy, the enthalpy of fusion. But if phase change materials (PCMs) are utilized in concert with icephobic substrates, then energy stored in the PCMs can be used to raise the icing temperature to assist in icing prevention. US2018/0230972A1 discusses the use of PCM (paraffin oil) to prevent freezing on wind turbine blades. PCMs were blended into either paint or coating on wind turbine blades to prevent ice accumulation on the leading edge. The use of paraffin oil/wax in silica microcapsules using sol-gel technology (inorganic microcapsules) was described for application in paint. The data disclosed in the application used in an environmental chamber, showed ice delay time in the range of 20-30 minutes.

WO2020180826A1 by Sushant "provides method for inhibiting the formation of ice on a surface, reducing contact line pinning at a water-solid interface, inhibiting the transition of water from a vapor state to a solid state (desublimation), and decreasing adhesion of a substance to a surface, which methods comprise, in various aspects, applying to a surface one or more phase change materials where the phase change materials have a melting point above a temperature at which ice formation occurs on the surface". Sushant appears to essentially use PCMs directly on surfaces and examines the freezing delay under only frosting conditions as long as the PCM can provide sufficient latent heat to melt or delay the freezing. This is very different from the instant application to prevent icing accretion on surface under sailing through Arctic Sea conditions where the climatic conditions are much more severe and unpredictable. In this third general embodiment, the PCMs can be encapsulated to provide sufficient enthalpy of fusion, contributing to the high energy surface design and topography to prevent all freezing mechanisms. Also, direct use of PCM without confinement, as in Sushant, may result in loss, contamination or reduced efficacy on some of the PCMs under multiple freeze-thaw cycles as compared to encapsulated PCMs.

In accordance with various aspect of the disclosure, it is desirable to include an energy storage substance, such as PCMs, into the icephobic treatment system. PCMs can be utilized to delay ice nucleation and ice crystallization kinetics by providing small amount of heat reverse the nucleation process or erect energy barriers to disrupt the ice crystallization propagation process. The use of PCMs to further enhance icing delay times under severe weather conditions provide a multi-line defense system to ensure system integrity of key onboard components from being frozen. A non-limiting list of PCMs with melting point close to water freezing point and much earlier transition temperatures are listed in Table 1.

TABLE 1

| PCM | Formula | Melting Point (° C.) |
| --- | --- | --- |
| 2-heptyne | $C_7H_{12}$ | 1.25 |
| Formamide | $CH_3NO$ | 2.55 |
| n-dodecyl acetate | $C_{12}H_{24}O_2$ | 1.25 |
| Tert-butyl mercaptan | $(CH_3)_3CSH$ | 1.4 |
| Bi-cyclohexyl | $C_{12}H_{16}$ | 3.63 |
| n-Tridecane | $C_{13}H_{28}$ | −6 |
| 31 $Na_2SO_4$ | 31 $Na_2SO_4$ | 4 |
| n-Tetradecane | $C_{14}H_{30}$ | 5.5 |
| Docosane | $C_{22}H_{46}$ | 44.4 |
| Eicosane | $C_{20}H_{42}$ | 36.8 |
| Octadecane | $C_{18}H_{38}$ | 28.2 |

As discussed above, one aspect of the disclosure is the development of the process and fabrication of the PCM-containing microcapsules. The concept is to embed/disperse the microcapsules on an icephobic structure to provide latent heat to stop, retard or reverse the formation of ice crystals, or to melt the ice to revert back to at least freezing point conditions so that icing delay time can be lengthened. For this purpose, the microcapsules need to have strong mechanical properties to endure the PCM phase change cycles to release heat or absorb heat depending on the direction of the phase change. At the same time, the microcapsules are composed of polymers and their heat transfer characteristics are not rapid, so the capsules need to be modified to improve the heat transfer across the capsule wall to effect temperature change.

Figure 5A:
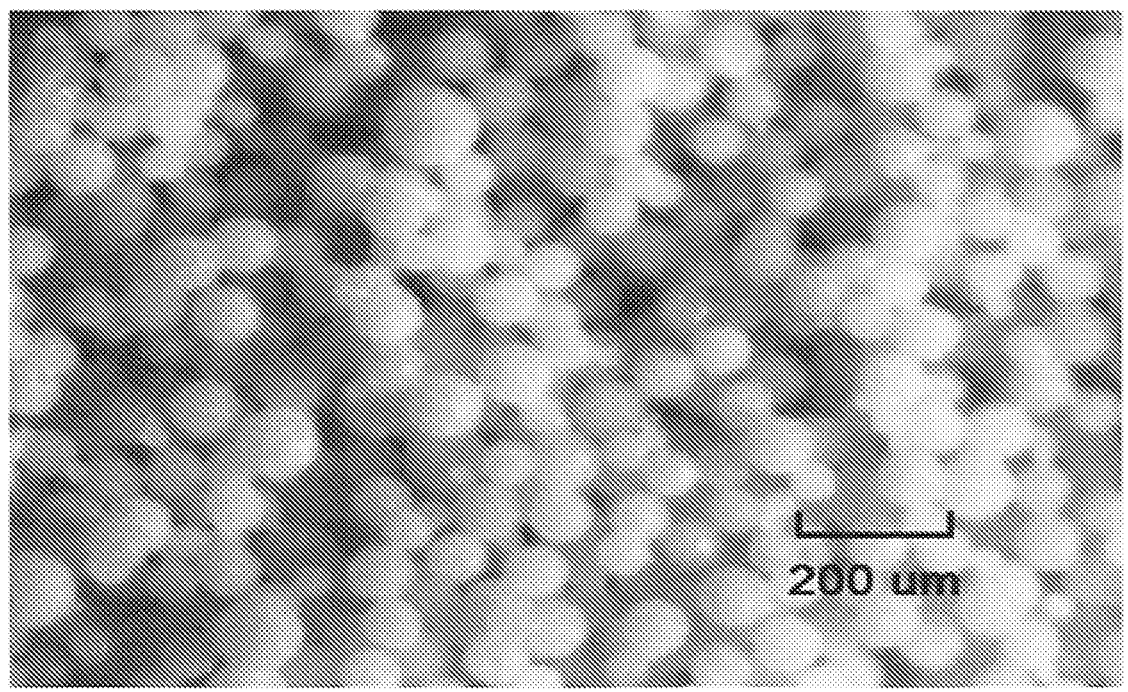
FIG. 5A is a magnified photograph of PCM-containing microcapsules modified with silica nanoparticles attached to the capsule wall. The PCM microcapsules are fabricated using unique interfacial polymerization method for enhanced heat transfer characteristics.
Figures 5B, 5C:
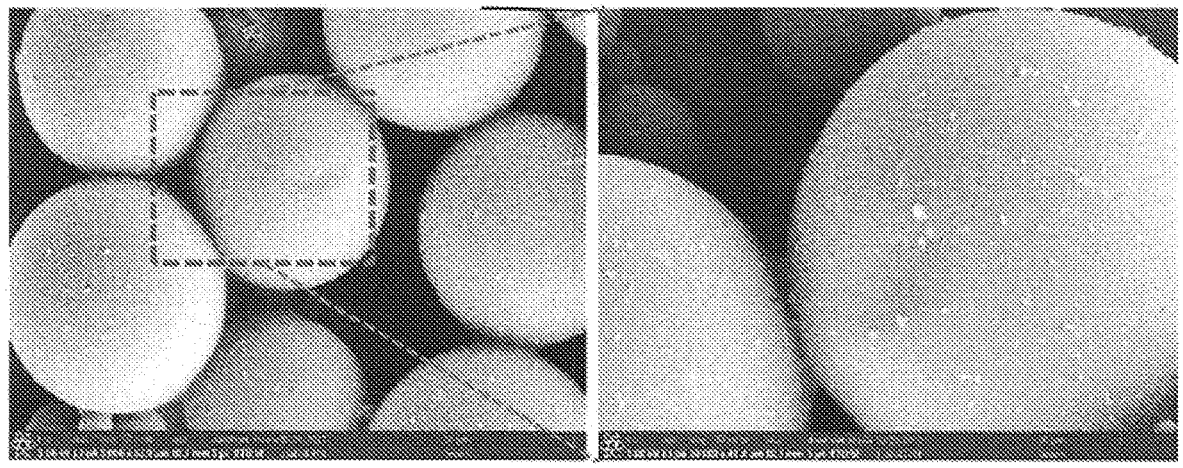
FIGS. 5B and 5C are SEM images of the PCM-containing microcapsules of FIG. 17A.

One microencapsulation process is described in U.S. Pat. No. 10,611,983, the entire contents of which are incorporated herein by reference. The general process steps are as follows. First, to encapsulate a PCM or a mixture of PCMs, an aqueous suspension of emulsifier(s) is prepared. A PCM or mixture of PCMs and monomer precursors of a polymer, a preformed polymer or polymer to be formed in-situ, is dissolved in an oil phase (organic solvents). The solution is emulsified with stirring for about 60 minutes at room temperature. The bath temperature is then raised to 40-80° C. over a 30 minute period and maintained for a further 2-12 hours for to allow interfacial polymerization to form the microcapsules. The reaction mixture is then cooled and diluted with water. The microcapsules are then isolated, washed with DI water, and dried. The produced microcapsules have a core of PCMs or a mixture of several PCMs, polar and non-polar, polar, and metal containing, and non-polar and metal containing. The capsule surface is generally smooth and the capsules have diameters ranging from about 5 µm to about 80 µm. In some instances, the size of the capsules can be made to several hundreds of micrometers by adjusting the stirring speeds. In some instances, the microcapsules exhibit a polymer shell with a thickness of 1±0.5 µm. The size of the microcapsules can be controlled by using ionic/non-ionic emulsifiers, and by changing the stirring speed (e.g., in a range of 500-20,000 rpm), temperature (e.g., in a range of 20-100° C.), and concentration of the emulsifier (e.g., in a range of 0.05-2 wt. %). The microcapsules can be dispersed in a solution of silica nanoparticles (2 to 100 nm diameters, preferably from 5 to 15 nm diameters) in DI water over night. The silica nanoparticles adsorbed microcapsules can then be formed. Carbon nanotubes can also be used as part of the shell wall to enhance the heat transfer characteristics of this new generation of microcapsules using PCMs. The microcapsule formed and the surface modification are shown in FIGS. 5A-C.

Figure 6:
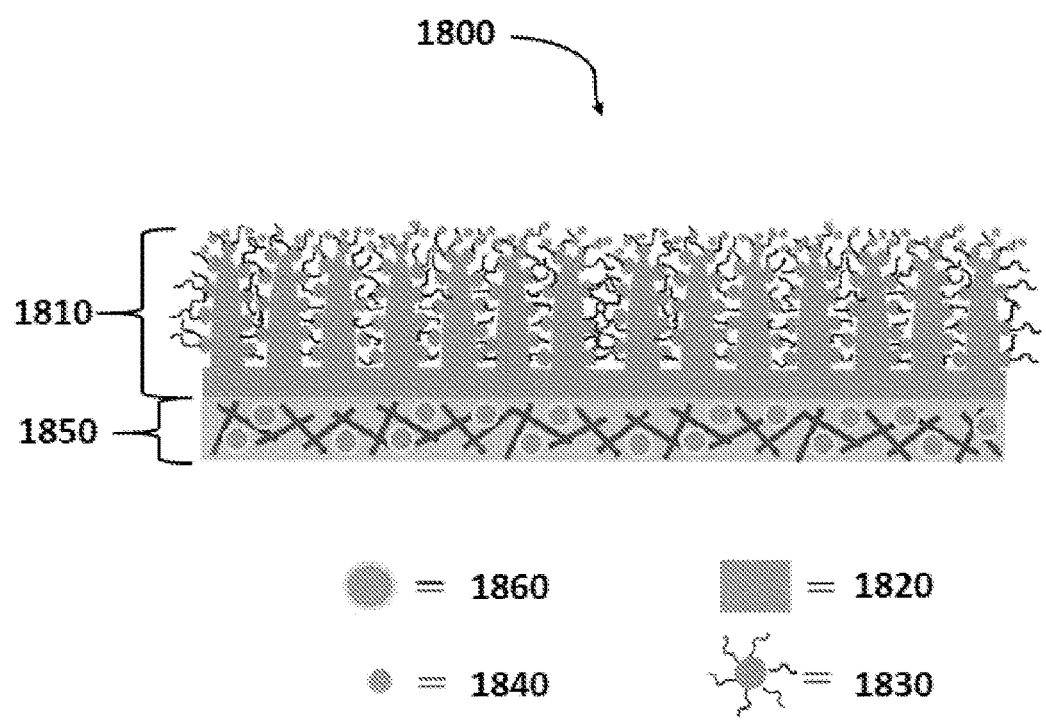
FIG. 6 is a cross-sectional schematic illustration of using microencapsulated PCMs as part of the surface treatment and placed underneath the aluminum foil to prohibit icing in addition to the existing design.

The present invention provides two paths to incorporate the PCM microcapsules. As shown in FIG. 6, one substrate configuration comprises the icephobic substrate 610 comprising bases substrate 620, NP-CNTs 630 and fluorinated POSS compounds 640, and a layer 650 comprising phase change materials or microencapsulated phase change materials 660. In this configuration, the phase change materials or microencapsulated phase change materials are located in segregated compartments underneath the icephobic substrate. The PCMs will respond to temperature change son the icephobic substrate and passively release the latent heat to heat up the surface structure to retard freezing.

Another embodiment of current invention is to disperse smaller sized microcapsules within the CNTs of the icephobic substrate, where the local temperatures near the surface can be used to release the latent heat triggered by the temperature drops.

Figure 7:
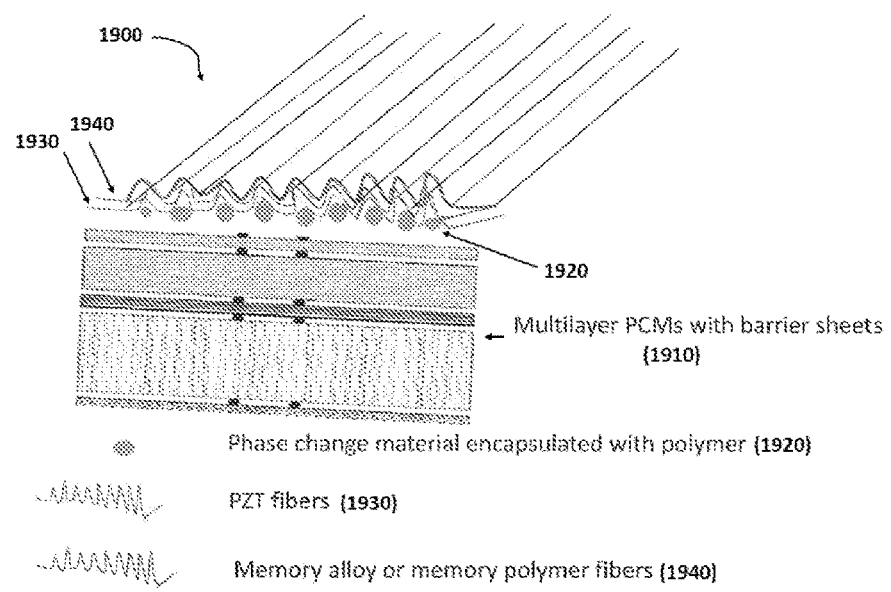
FIG. 7 is a schematic illustration of a smart proactive anti-icing surface design incorporating PZT and memory alloy with PCM underneath the aluminum foil. A microprocessor provides control and sensing capability to provide sufficient heat to prevent icing up to the limit of energy available.

In another aspect of the current invention, as shown in FIG. 7, underneath the substrate, piezoelectric fibers (PZT) intertwined with memory alloy wires placed underneath the substrate can automatically generate a small amount of heat when the surface freeze. Ice is 8.3% larger than water by volume, so as the water freezes on top, the surface will bend, triggering the PZT to extend its length, hence generating electricity. The amount of electricity generated is relatively small, but its impact locally can be significant.

In the overall design of this novel icephobic surface, once we have PZT fibers, we can also use these PZT as actuators and bury a micro-processor to actively control the heat release and shut off, in such a way, the system can function autonomously with built-in small packets of AI (artificial intelligence) and ML (machine learning) to keep the surface ice-free under most common conditions.

Up to this point in time, most of the icephobic surface design are 100% passive. The space underneath the aluminum foil, given 2-5 mm range of thickness allowance, a microprocessor (smart chip) can be buried underneath the foil, at the bottom of the chip, a layer of conducting polymer will be cut into squares to govern the area of influence. A watch thin battery can be used to power the chip and control the heat flow and various sensors. This will be a truly ice-free icephobic surface.

Also for example, in a fourth general embodiment, icephobic substrates according to various aspects of the present disclosure can be used in various applications in the form of an icephobic substrate with an underlying layer comprising one or more of microsensors, actuators and heating elements (cumulatively "electronic components"), wherein a first side of the icephobic substrate has the NP-CNT conjugates and fluorinated POSS compounds and a second side, opposite the first side, is coupled with the electronic components and controlled using, for example, a microprocessor.

In some or all of the general application embodiments above, the icephobic surface of the substrate can be coated with a protective polymeric film. The polymeric film can be removable and may serve to prove the icephobic surface from environmental conditions prior to use. In some instances, the polymeric films can have a nanometer-scale thickness and be designed to wear away, exposing the icephobic surface to the external environment, after a desired period of time after installation on or in an end-use product.

In accordance with various aspects of the disclosure, a first embodiment of an icephobic substrate comprises a base substrate; and an icephobic coating on a first surface of the base substrate, the icephobic coating comprising nanoparticles on the first surface of the substrate, carbon nanotubes bound to the nanoparticles, and fluorinated polyhedral oligomeric silsesquioxane (POSS) compounds located in and/or on the carbon nanotubes; wherein the icephobic substrate has a plurality of flowpaths for the movement of solids and/or liquids relative to the icephobic coating.

In accordance with various aspects of the disclosure, a second embodiment of an icephobic substrate is an icephobic substrate according to the first embodiment, wherein the plurality of flowpaths facilitate movement of liquids relative to the icephobic coating at a rate sufficient to prevent conversion of the liquids to solids.

In accordance with various aspects of the disclosure, a third embodiment of an icephobic substrate is an icephobic substrate according to the first embodiment or second embodiment, wherein the base substrate is made of a sheet of a non-porous material.

In accordance with various aspects of the disclosure, a fourth embodiment of an icephobic substrate is an icephobic substrate according to any one of the first through third embodiments, wherein the base substrate has a disordered surface texture with the nanoparticles on the disordered surface texture.

In accordance with various aspects of the disclosure, a fifth embodiment of an icephobic substrate is an icephobic substrate according to the fourth embodiment, wherein the disordered surface texture comprises a plurality of multi-scale watersheds.

In accordance with various aspects of the disclosure, a sixth embodiment of an icephobic substrate is an icephobic substrate according to any one of the first through fifth embodiments, wherein the base substrate is made of any one of a metal mesh, an alloy mesh, a woven fiber, a non-woven fiber, a woven fabric, and a non-woven fabric.

In accordance with various aspects of the disclosure, a seventh embodiment of an icephobic substrate is an icephobic substrate according to any one of the first through sixth embodiments, wherein the base substrate is made a glass, a ceramic, a metal, an alloy, a metal oxide, a plastic, a rubber, an animal-derived textile, a plant-derived textile, a synthetic textile, or any combination thereof.

In accordance with various aspects of the disclosure, an eighth embodiment of an icephobic substrate is an icephobic substrate according to any one of the first through seventh embodiments, wherein the base substrate is made a metal, an alloy, a metal oxide, or any combination thereof.

In accordance with various aspects of the disclosure, a ninth embodiment of an icephobic substrate is an icephobic substrate according to any one of the first through eighth embodiments, wherein the nanoparticles have diameters ranging from about 5 nm to about 250 nm.

In accordance with various aspects of the disclosure, a tenth embodiment of an icephobic substrate is an icephobic substrate according to any one of the first through ninth embodiments, wherein the nanoparticles have diameters ranging from about 5 nm to about 100 nm.

In accordance with various aspects of the disclosure, an eleventh embodiment of an icephobic substrate is an icephobic substrate according to any one of the first through tenth embodiments, wherein the nanoparticles have diameters ranging from about 5 nm to about 20 nm.

In accordance with various aspects of the disclosure, a twelfth embodiment of an icephobic substrate is an icephobic substrate according to any one of the first through eleventh embodiments, wherein the nanoparticles are made of any one of a metal, a metal alloy, a metal oxide, a glass, a ceramic, and a polymer.

In accordance with various aspects of the disclosure, a thirteenth embodiment of an icephobic substrate is an icephobic substrate according to any one of the first through twelfth embodiments, wherein the nanoparticles are silica nanoparticles.

In accordance with various aspects of the disclosure, a fourteenth embodiment of an icephobic substrate is an icephobic substrate according to any one of the first through thirteenth embodiments, wherein the carbon nanotubes are single-walled carbon nanotubes.

In accordance with various aspects of the disclosure, a fifteenth embodiment of an icephobic substrate is an icephobic substrate according to any one of the first through thirteenth embodiments, wherein the carbon nanotubes are multi-walled carbon nanotubes.

In accordance with various aspects of the disclosure, a sixteenth embodiment of an icephobic substrate is an icephobic substrate according to any one of the first through fifteenth embodiments, wherein the carbon nanotubes have up to about 30 wt % of total impurities.

In accordance with various aspects of the disclosure, a seventeenth embodiment of an icephobic substrate is an icephobic substrate according to any one of the first through sixteenth embodiments, wherein the fluorinated POSS compounds have the chemical formula $[RSiO_{3/2}]_n$, where R is a fluorocarbon and n is 6, 8, 10 or 12.

In accordance with various aspects of the disclosure, an eighteenth embodiment of an icephobic substrate is an icephobic substrate according the seventeenth embodiment, wherein n is 8.

In accordance with various aspects of the disclosure, a nineteenth embodiment of an icephobic substrate is an icephobic substrate according to the first seventeenth embodiment or the eighteenth embodiment, wherein R is any one of trifluoromethyl, perfluorododecyl, perfluorodecyl, perfluorotetradecyl, tridecafluoro-1,1,2,2-tetrahydrooctyl, 4-perfluorooctylphenyl, pentafluorophenyl, p-trifluoromethyltetrafluorophenyl, nonafluorohexyl, or heptdecafluoro-1,1,2,2-tetrahydrodecyl.

In accordance with various aspects of the disclosure, a twentieth embodiment of an icephobic substrate is an icephobic substrate according to any one of the first through nineteenth embodiments, further comprising a heating element coupled with a second surface of the base substrate.

In accordance with various aspects of the disclosure, a twenty-first embodiment of an icephobic substrate is an icephobic substrate according to the twentieth embodiment, wherein the heating element comprises one or more phase change materials.

In accordance with various aspects of the disclosure, a twenty-second embodiment of an icephobic substrate is an icephobic substrate according to the twenty-first embodiment, wherein the one or more phase change materials are contained within microcapsules.

In accordance with various aspects of the disclosure, a twenty-third embodiment of an icephobic substrate is an icephobic substrate according to any one of the twentieth through twenty-second embodiments, wherein the heating element comprises piezoelectric fibers.

In accordance with various aspects of the disclosure, a twenty-fourth embodiment of an icephobic substrate is an icephobic substrate according to any one of the twentieth through twenty-third embodiments, wherein the heating element comprises a microsensor and/or an actuator.

In accordance with various aspects of the disclosure, a twenty-fifth embodiment of an icephobic substrate is an icephobic substrate according to any one of the twentieth through twenty-fourth embodiments, further comprising an adhesive on a surface of the heating element.

In accordance with various aspects of the disclosure, a twenty-sixth embodiment of an icephobic substrate is an icephobic substrate according to any one of the first through nineteenth embodiments, further comprising a layer having electronic components, the layer coupled with a second surface of the base substrate.

In accordance with various aspects of the disclosure, a twenty-seventh embodiment of an icephobic substrate is an icephobic substrate according to the twenty-sixth embodiment, further comprising an adhesive on a surface of the layer.

In accordance with various aspects of the disclosure, a twenty-eighth embodiment of an icephobic substrate is an icephobic substrate according to any one of the first through nineteenth embodiments, further comprising an adhesive on a second surface of the base substrate.

In accordance with various aspects of the disclosure, a twenty-ninth embodiment of an icephobic substrate is an icephobic substrate according to any one of the first through twenty-eighth embodiments, further comprising a protective polymeric film on the icephobic coating.

EXAMPLES

General Testing Methodologies. As discussed above, since there is no standard definition for what makes a surface icephobic, measurement methodologies and types of data for evaluating icephobic surfaces are equally unstandardized. Failing to find testing and instrumental standards to measure ice formation and accretion, the inventors of this application have designed and built three novel instruments, a cryogenic differential scanning calorimeter (C-DSC), a cryogenic simultaneous differential scanning calorimeter/thermogravimetric analyzer (CS-DSC/TGA), and an All-weather Simulation Chamber.

Figures 8A, 8B, 8C:
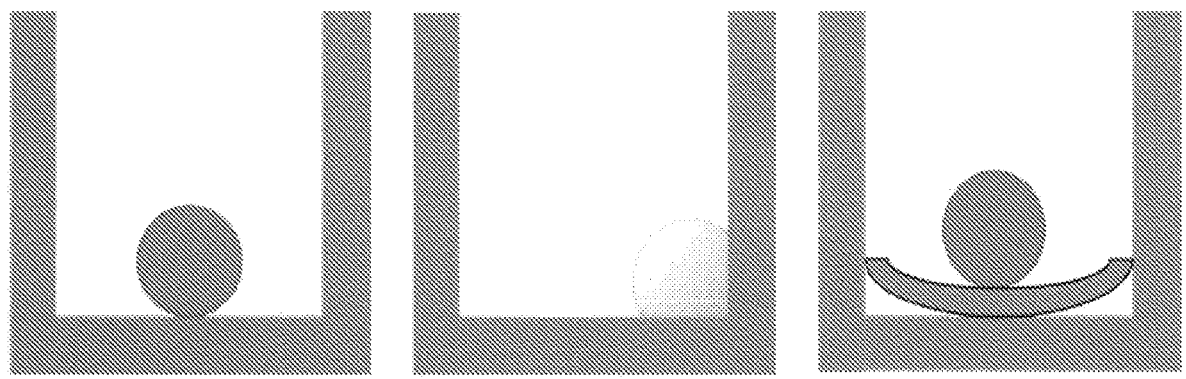
FIGS. 8A-B are cross-sectional schematic illustrations of a C-DSC sample cup having a water droplet in the center of the cup (FIG. 8A) and a water droplet accumulated at an inner corner surface of the cup (FIG. 8B).
FIG. 8C is a cross-sectional schematic illustration of a modified C-DSC sample cup designed to eliminate water accumulation at inner corner surfaces of the cup.
Figure 9:
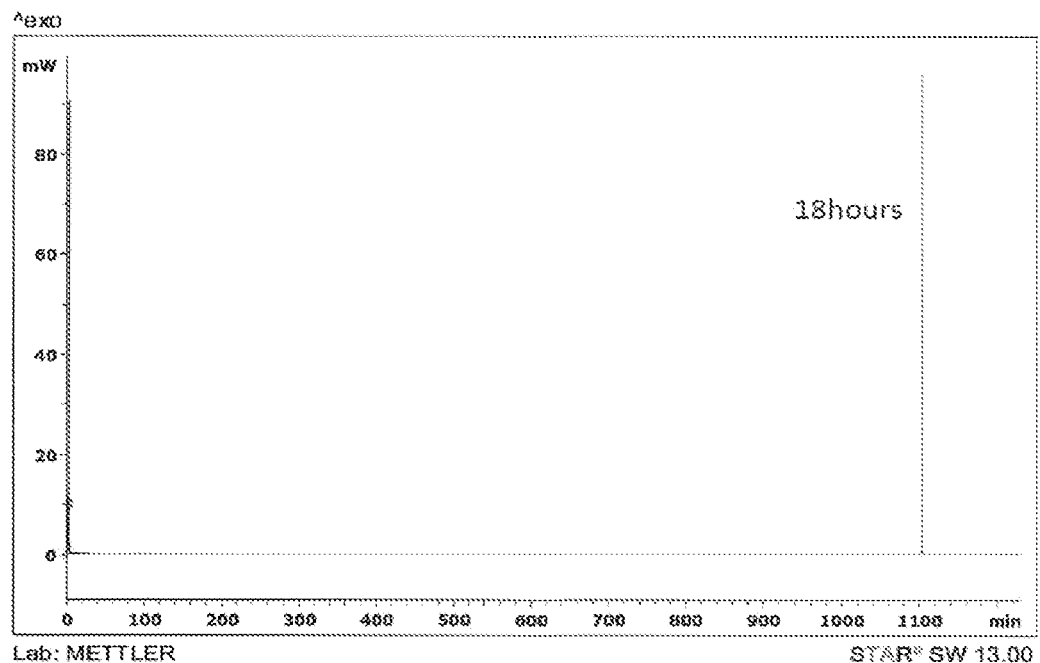
FIG. 9 is a graph showing icing delay time as measured by C-DSC induction time of water freezing peak.

The novel C-DSC is capable of measuring the heat of enthalpy of fusion from room temperature to −80° C. When water freezes, the latent heat that evolves will appear as a peak, indicating the transition from water to ice. The instrument is very sensitive and accurate in determining the transition of water from liquid to solid (i.e., ice) on substrate surfaces. Since the enthalpy of fusion is a constant, ice formation can be rapidly determined using the C-DSC. Differential scanning calorimeters (DSCs) are commonly used to measure vaporization and oxidation from room temperature to 800° C. The novel C-DSC, on the other hand, can obtain measurements at operating temperatures as low as −80° C. In a standard DSC, the typical measurement is to put a drop of water into a standard DSC sample cup (FIG. 8A) and seal the lid and measure induction time for the latent heat of fusion to appear. However, results can be unreliable in when using standard DSC sample cups, due to the tendency of water droplets to aggregate around the corner of sample cup (FIG. 8B). In the inventive C-DSC, the solution was to fabricate a shallow circular and concave sample disk (i.e., make a circular and concavely shaped icephobic substrate sample for DSC analysis) using a DSC punch tool (FIG. 8C). This solved the problem. FIG. 9 shows a typical water droplet freezing delay time of 18 hours which is a record, since most of the delay times reported in the literature are under 2 hours and the majority of them are several minutes. Currently, using specially fabricated sample disks, as shown in FIG. 8C and the C-DSC, we have achieved icing delay times beyond 60 hours and up to 100 hours. The test is simple static test to test the effectiveness of the icephobic surface treatment. The results can be used to compare different materials, different icephobic coatings, and different chemistry, etc. Since the test is static under a single temperature difference as an icing driving force, the results are not a simulation test reflecting various conditions, which the all-weather chamber is capable of doing.

The novel CS-DSC/TGA can simultaneously conduct quantitative water accumulation measurements (weight gain over time) and heat of enthalpy of fusion from room temperature to −80° C. (as discussed above, when water freezes, the latent heat that evolves will appear as a peak, indicating the transition from water to ice). The TGA component of the CS-DSC/TGA measures weight gain or loss as a function of increasing temperature over time. It can measure the amount of water that is deposited on a substrate surface over time. Once the water starts to freeze, the DSC component of the CS-DSC/TGA will measure the transition of water from liquid to solid (i.e., ice) on the substrate surface.

The novel All-weather Simulation Chamber is equipped with four sample weighting stations to measure ice accretion under several simulated weather conditions: rain, snow, freezing rain, with variable wind gusts, and has an operational temperature range of room temperature to −50° C.

Example 1—Preparation of an Icephobic Aluminum Substrate. One key embodiment of the invention is the discovery that we can use a variety of metals to induce the formation of large variety of metal oxides, many of which have nano-, micro-crystalline structures suitable for the substrate of an icephobic surface design and fabrication. This provides uniform roughness and unique features. For illustration purpose, we selected aluminum and its oxide Boehmite. The key advantage for using aluminum is its consumer-level cost and availability, high purity aluminum foils often can be found in grocery or supply stores are 99.99% pure and are available at low cost. So, the cost advantage of aluminum is significant.

Figure 10:
FIG. 10 is a photograph of pure aluminum foil that has been crumpled/folded to create a randomly oriented multi-scale watersheds.

In this example, we develop a low-cost method to make multiscale built-in watersheds (i.e., dividing ridges between drainage areas) for an icephobic aluminum substrate. As discussed previously, watersheds facilitate the movement of liquids and solids (with molecular layer of water such as ice crystals) relative to the substrate surface (specifically, the watersheds provide a pathway for liquids and solid to move on the substrate surface). Based on chaos theory, the preparation of an aluminum surface having randomly oriented surface features can be easily made by crumpling a sheet of aluminum foil (Reynolds wrap, 99% pure) several times or randomly folding the sheet in multiple directions. FIG. 10 is a photograph of pure aluminum foil that has been crumpled/folded to create a randomly oriented multiscale watersheds. The crumpled sheet shows sophisticated and multiscale watersheds and water will roll down easily into the valleys of the aluminum surface in the state shown in FIG. 10. After the surface has been further modified to be hydrophobic, however, as described in the subsequent steps of this example, the ability of liquid and ice crystals will move along the surface will be enhanced.

The crumpled aluminum foil was washed via sonication in a pyridine solution for 10 min at 40° C. (30°-60° range) in a class 100 clean room. Depending on the purity and surface contamination present on the aluminum foil, this process may be repeated and/or the temperature of the pyridine solution may be raised during sonication. After sonication in the pyridine solution was completed, the surface was washed via sonication in double-distilled acetone for 10 min, followed by methyl ethyl ketone (MEK), followed distilled Hexene. The washed crumpled aluminum foil was then dried in a desiccator. The process should be conducted in clean room environment to avoid contamination.

Figure 11A:
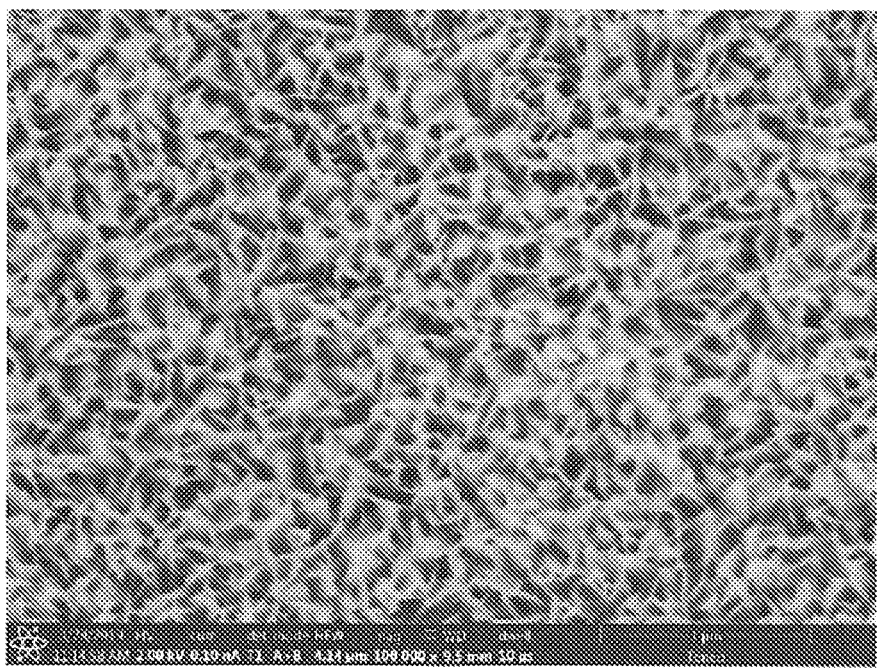
FIG. 11A is a scanning electron microscopy (SEM) image of microcrystalline Boehmite on the aluminum surface of FIG. 10 after hydrothermal oxidation.
Figure 11B:
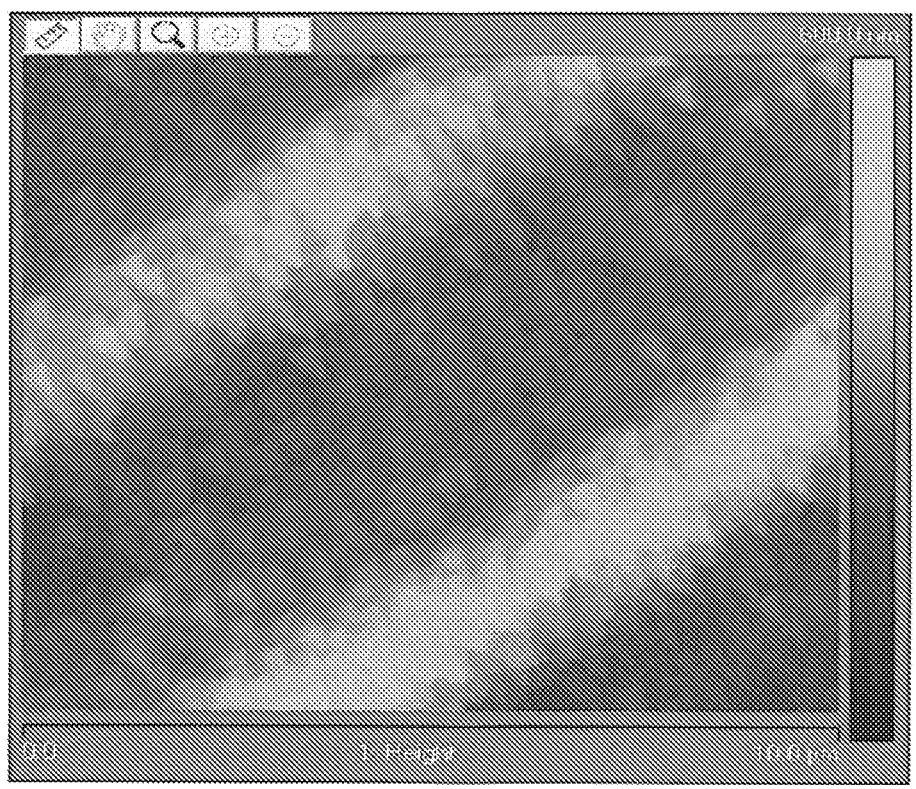
FIG. 11B is a 3D scan of the microcrystalline Boehmite on the aluminum surface of FIG. 11A.
Figure 12A:
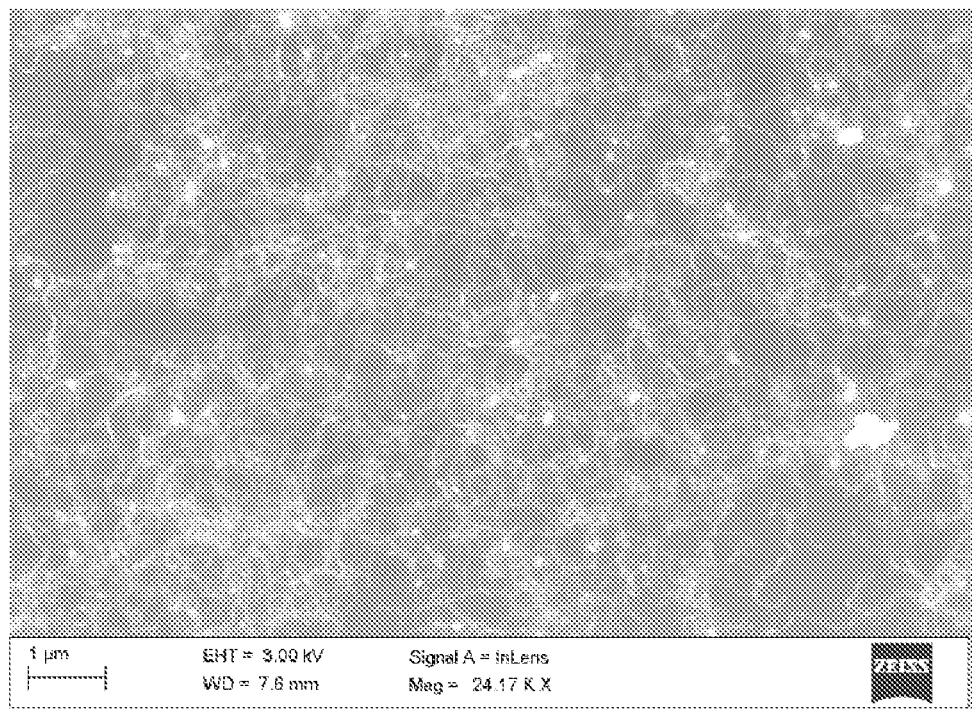
FIGS. 12A-D are SEM images of CNT-functionalized silica nanoparticles.
Figure 12B:
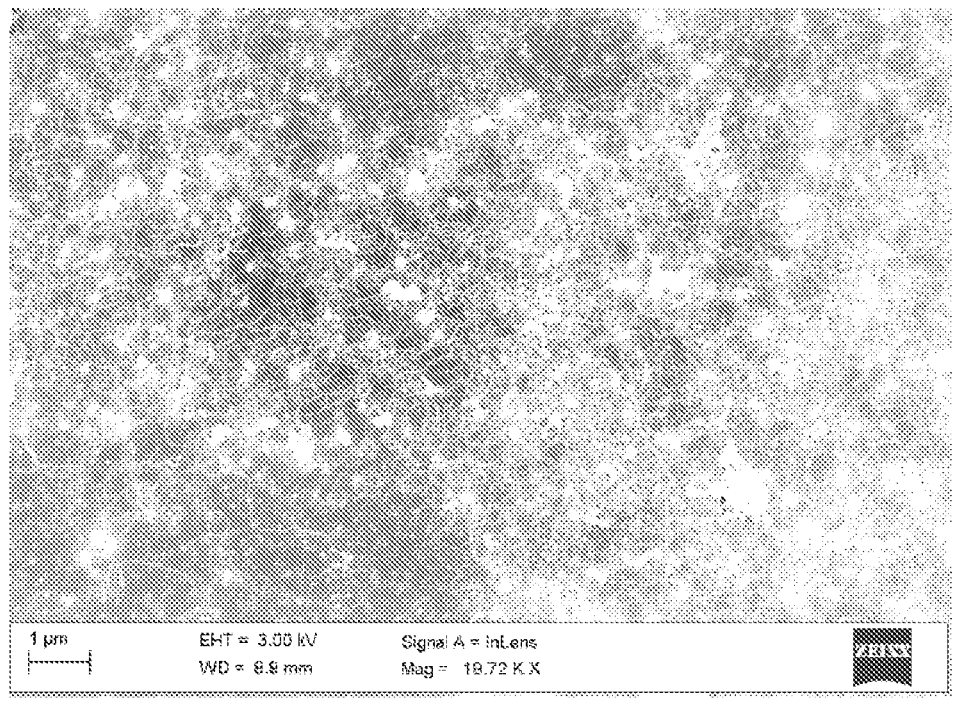
Figure 12C:
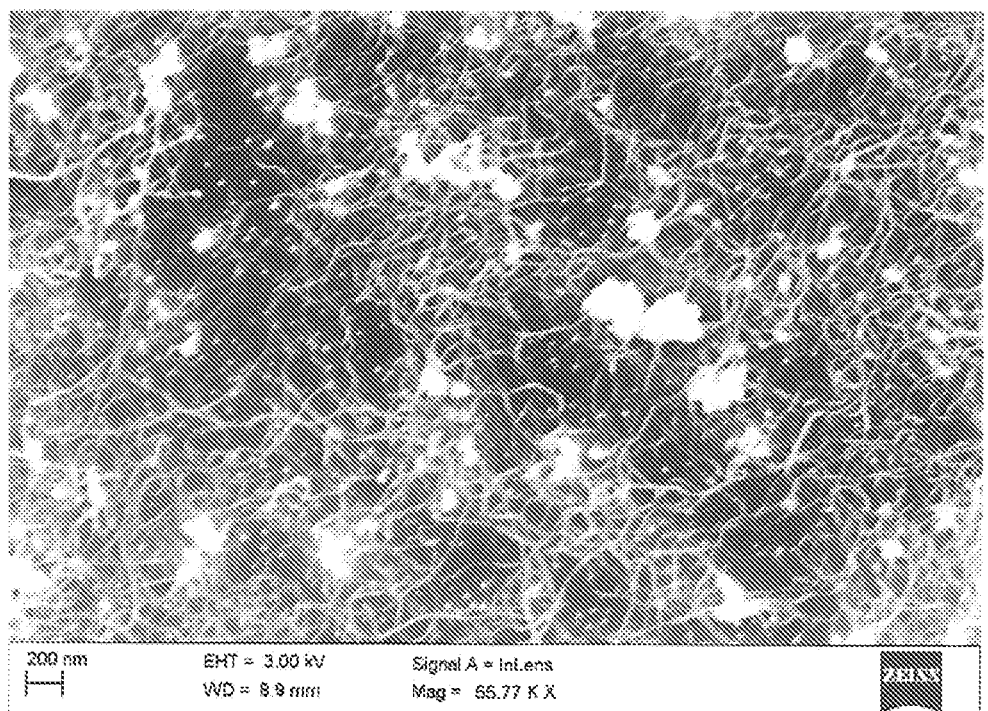
Figure 12D:
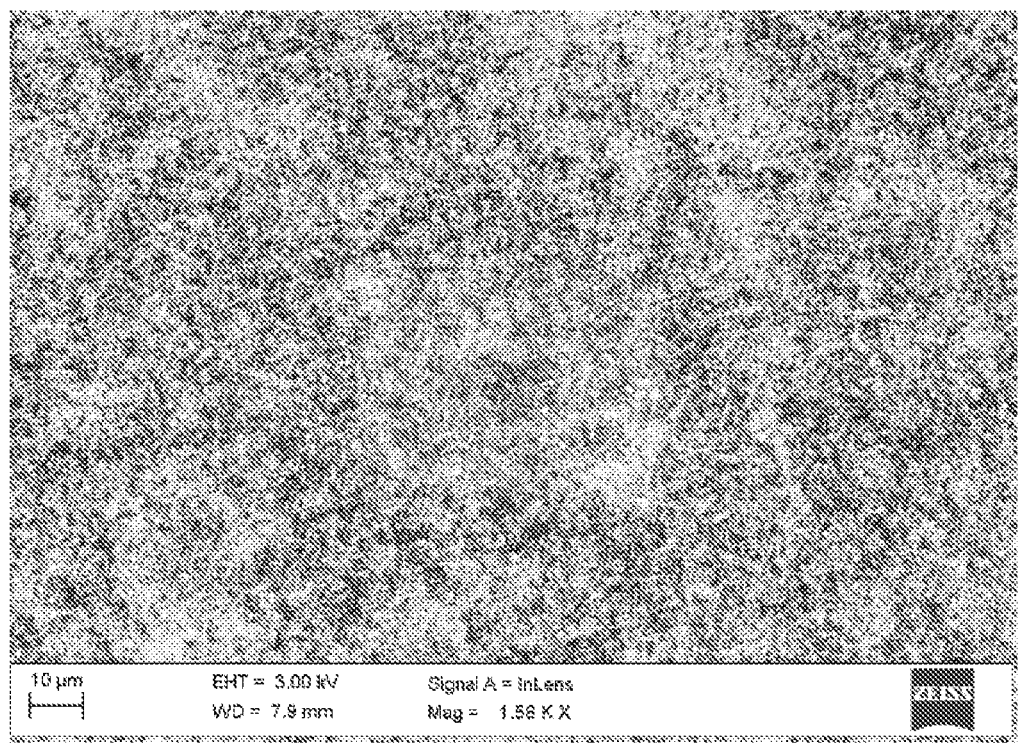

Once the crumpled aluminum foil was dried, the foil was subjected to a hydrothermal oxidation step to convert to aluminum surface to Boehmite nano- and/or micro-crystalline solids. Generally, this step should be carried out immediately after the cleaning process. The cleaned and dried Aluminum foil was immersed in boiling Triethanolamine (reaction catalyst, other catalysts or amines can be used) solution (0.1%-2% solution in distilled water) at a temperature (from 60° C. to 80° C.) for 2-8 hours. The processing conditions primarily depend on the quality of the aluminum foil purity, thickness, and degree of surface contamination. If the cleaning process is inadequate, the surface will not be covered uniformly by Boehmite. Our objective in this processing step is to produce the uniform crystalline surface without surface defects as shown in FIG. 11A. The present invention provides a unique way to convert the aluminum surface into nano-micro-crystalline solid by hydrothermal oxidation of the surface. Aluminum has several oxides and hydroxides such as Gibbsite, Bayerite, and Boehmite. We selected Boehmite developed a hydrothermal oxidation process to create a uniform nano-, micro-scale crystalline surface. FIG. 11A shows SEM micrograph of the Boehmite microcrystalline surface produced on the aluminum foil substrate, and FIG. 11B is a 3D scan of the microcrystalline Boehmite using a dual white light interferometric microscope.

The next step in the icephobic surface process is to add multiwalled carbon nanotubes (MWCNTs) to bond with Boehmite. Both CNT and Boehmite are non-reactive surface so the attachment process will have to be done via silicate nanoparticles. The size of the silicate nanoparticles used ranged from 5 nm to 100 nm, preferably 8-12 nm diameter range. For illustrative purpose, we used 12 nm diameter silica nanoparticles for this processing step. The silicate nanoparticles were cleaned in freshly prepared piranha solution ($H_2SO_4$:$H_2O_2$ in 3:1 v/v ratio) at 90° C. for 60 minutes. This step is to remove the oxide layer and make the surface reactive, so it is important to ensure that the step was done carefully and thoroughly. The clean particles were washed with DI water until neutral pH was reached. The silica nanoparticles were dispersed in 0.2% v/v 3-aminopropyltriethoxysilane (APS) in anhydrous toluene for 24 hours at 75° C. This self-assembly adsorption process had to be conducted in clean room environment at stable temperature. The APS functionalized silica nanoparticles were washed with fresh toluene and stored in the desiccator under vacuum for the next step. Meanwhile, MWCNTs were functionalized with carboxylates using a reflux method with nitric acid for 6 hours at 60° C. at a $HNO_3$:CNT ratio of 1:5. This is followed by the second reflux in thionyl chloride, first sonicated for 15 minutes and then refluxed at 80° C. for 24 hours. The mixture was centrifuged and dried under vacuum to remove residual thionyl chloride. At this stage, the —C(═O)—Cl functionalized MWCNTs were dispersed in dimethyl formamide with the APS functionalized silica nanoparticles at 40° C. for 24 hours; a reaction between the primary amine of the APS ligands and the —C(═O)—Cl ligands resulted in an amide bond covalently attaching MWCNTs to silica nanoparticles (CNT-functionalized silica nanoparticles, or $SiO_2$ NP-MWCNT conjugates), as shown schematically in FIG. 3. After coupling, the $SiO_2$ NP-MWCNT conjugates were separated by centrifuge and washed with distilled acetone and dried. The $SiO_2$ NP-MWCNT conjugates were then re-dispersed in ethanol for deposition on the Boehmite surface of the crumpled aluminum foil. FIGS. 12A-D are SEM images of the resulting CNT-functionalized silica nanoparticles.

Figure 13A:
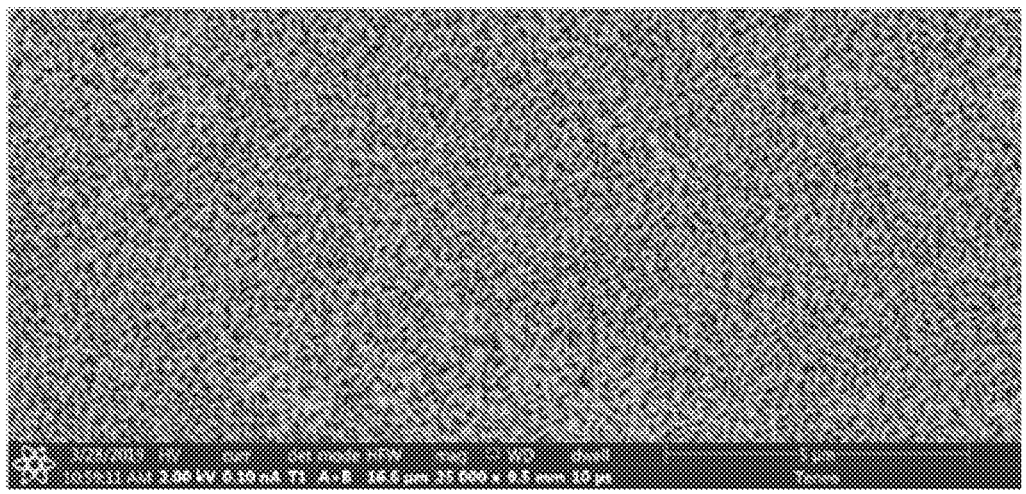
FIGS. 13A-B are SEM images of aluminum foil surface with the microcrystalline Boehmite (FIG. 11A) after deposition of CNT-functionalized silica nanoparticles (FIG. 3) on its surface.
Figure 13B:
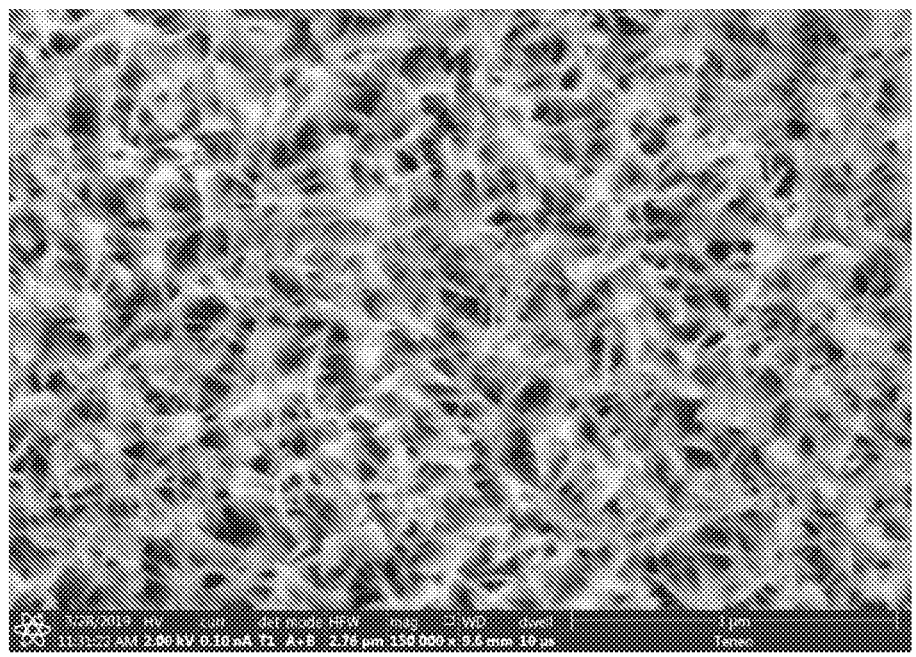

The $SiO_2$ NP-MWCNT conjugates were diluted to 0.1 mg/ml in ethanol and sonicated for 10 minutes for uniform dispersion. The solution was loaded into an airbrush and filled in a glass chamber having the Boehmite-aluminum foil sample. The $SiO_2$ NP-MWCNT conjugates were then sprayed directly onto the Boehmite surface several times using an air brush pump. The $SiO_2$ NP-MWCNT conjugates adsorbed to the Boehmite surface. After adsorption, the sample was annealed at 100° C. for 60 minutes under nitrogen. FIGS. 13A-B are SEM images of aluminum foil surface with the microcrystalline Boehmite (FIG. 11A) after deposition of CNT-functionalized silica nanoparticles (FIG. 3) on its surface.

Next, a fluorinated POSS compound (made via hydrolysis and condensation of eight equivalents (n=8) of perfluorodecyltriethoxysilane, resulting fluorinated POSS molecule having a density of 2.1 g/cm$^3$, and melting point ranging from about 120-140° C. and a molecular weight of 3994 g/mol (FIG. 4) was impregnated into and/or onto the MWCNTs adsorbed on the sample surface. To facilitate such impregnation, a low molecular weight fluorinated solvent (Asahiklin 225, 42-52 wt % 3,3-dichloro-1,1,1,2,2-pentafluoropropane and 50-60 wt % 1,3-dichloro-1,1,2,2,3-pentafluoropropane) was first used to thoroughly wet the aluminum foil surface structures using an air brush pump in an enclosed glass chamber equipped with a vacuum nozzle. The inventors observed that impregnation of the POSS compound into the MWCNTs may be incomplete without prewetting with a low molecular weight fluorinated solvent. If necessary, a weak vacuum can be applied to facilitate the vapor flow path through the MWCNT covered surface. The POSS deposition can be repeated several times. After POSS impregnation, and the sample was annealed at 80° C. in an inert gas atmosphere for 24 hours.

Example 2—Ice Accretion Testing on Hanged Samples. Part of the embodiment of the invention is to measure the icephobic surface performance in resisting icing. In US 20100314575 by Gao, coated and uncoated samples are hanged on a tree during winter and icing is observed on the samples over time. As the temperature varied over time, no systematic ice accretion tests were used or established. Others have tested freezing in their labs but the key objective has been a binary "freeze or no freeze" measurement or how easily ice may be removed from samples.

To develop a consistent testing protocol, we set up a simple ice accretion test in a small freezer controlled at −20° C. and sprayed a controlled amount of water on the vertically hung samples (cloth, woven piece, glass, metal mesh, aluminum plate, steel, stainless steel, etc.) once every five minutes. The ice accretion was measured by analytical balance every 10 minutes.

Figure 14:
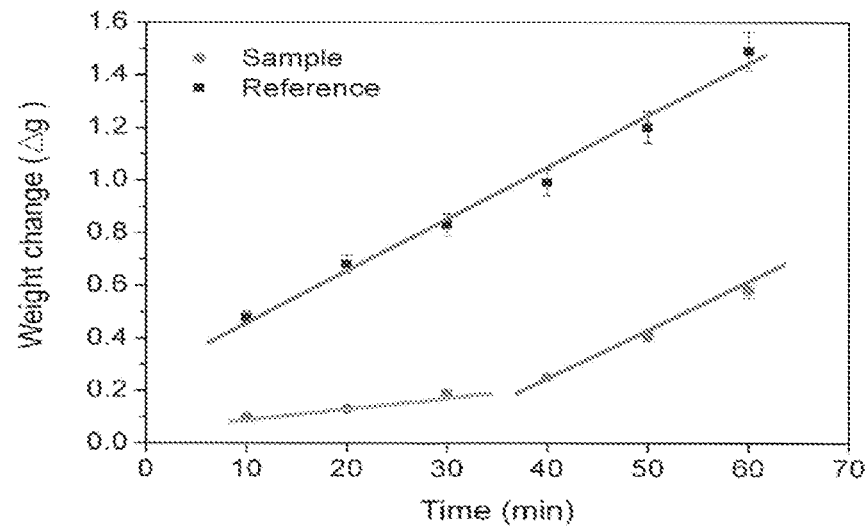
FIG. 14 is a graph showing ice accretion data for a cloth treated with CNT-functionalized silica nanoparticles (also referred to herein as SiO₂ NP-MWCNT conjugates) and fluorinated polyhedral oligomeric silsesquioxane (POSS) compounds (Sample) compared to untreated cloth (Reference) as a function of time at −20° C. with DI water sprayed once every 5 minutes. An icing delay on the inventive Sample is evident.

FIG. 14 shows the ice accretion data (weight change vs. time) on untreated and treated dust-cleaning cloth (Example 3). In this example, 0.5 ml of water was sprayed on each sample every 5 minutes. With respect to the untreated cloth, the data shows a linear weight increase as a function of time. The cloth treated with $SiO_2$ NP-MWCNT conjugates and fluorinated POSS compounds shows an ice accretion delay of about 36 minutes, then the ice accretion increases as indicated by an increasing slope similar to the untreated cloth sample. Since the sample is "micro-rough cloth", the weight increase transition at 36 minutes occurred when the cloth surface was covered by ice.

Figure 15:
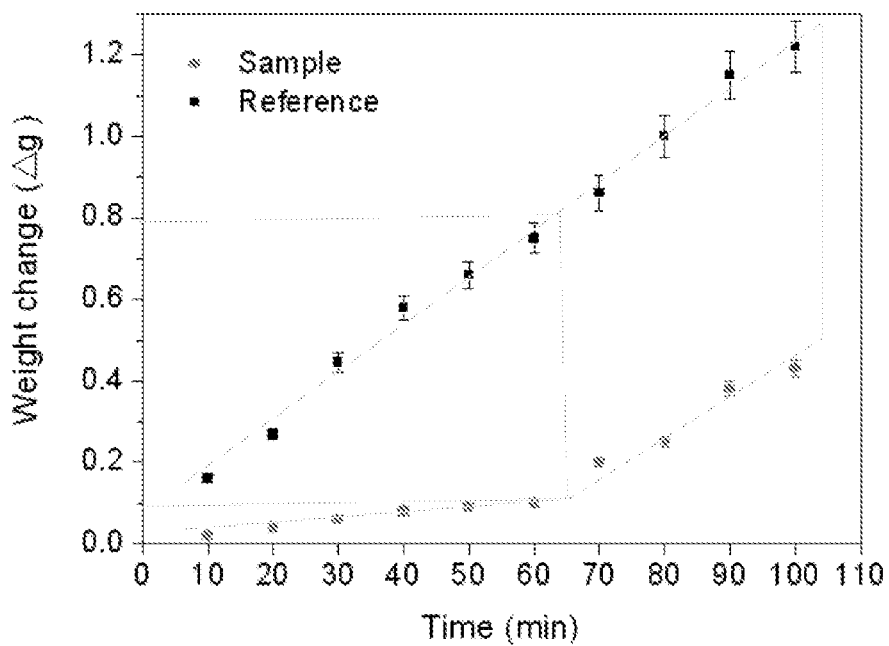
FIG. 15 is a graph showing ice accretion data for a mesh treated with CNT-functionalized silica nanoparticles (also referred to herein as SiO₂ NP-MWCNT conjugates) and fluorinated polyhedral oligomeric silsesquioxane (POSS) compounds (Sample) compared to untreated mesh (Reference) as a function of time at −20° C. with DI water sprayed once every 5 minutes. An icing delay on the inventive Sample is evident.

FIG. 15 shows the ice accretion data (weight change vs. time) on untreated and treated dirt-gathering mesh (prepared to a fabrication procedure as outlined in Example 4). In this example, 2 ml of water was sprayed on each sample every 5 minutes. With respect to the untreated mesh, the data shows a linear weight increase as a function of time. The mesh treated with $SiO_2$ $SiO_2$ NP-MWCNT conjugates and fluorinated POSS compounds shows an ice accretion delay of about 65 minutes, then the ice accretion increases as indicated by an increasing slope similar to the untreated cloth sample.

In both treated samples, once the surface is covered by a layer of ice, then the additional rate of ice accretion increase becomes essentially identical to its corresponding untreated sample; ice adding on ice is a universal phenomenon with a same slope under the same driving forces.

Example 3 Fabrication of Icephobic Cloth. In this example, the surface of a dust cleaning cloth is modified with $SiO_2$ NP-MWCNT conjugates (as prepared in Example 1) and fluorinated POSS compounds (as prepared in Example 1) using an application procedure substantially as outlined in Example 1.

FIG. 16 is a photograph showing the fluorinated POSS-treated cloth surface exhibits omniphobic characteristics towards both water (left) and oil (right). This effect is believed to be obtained from a combination of the use of small diameter fibers and the fluorinated POSS compounds. The effect of fibers can be explained by the steep wetting angle on individual plastic fiber's small diameter to shed liquid away from the contact area. This is an important observation. On flat smooth surfaces, the wetting theory uses self-rolling angles, advancing and receding angle hysteresis to indicate the need for high contact angles>160°. By using fiber-woven cloths with fibers, it appears that the apparent contact angle may be smaller but also effective in controlling wetting. Since the plastic fibers usually exhibit static electric forces, further experimental study on natural fibers may yield different results.

FIG. 17A is an SEM image of a dust-cleaning cloth using plastic fibers. FIG. 17B is an SEM image of plastic fiber bundles of the dust-cleaning cloth of FIG. 17A.

Example 4—Fabrication of Icephobic Metal Mesh. In this example, various sizes of steel mesh were treated with either only fluorinated POSS compounds (as prepared in Example 1) or a combination of $SiO_2$ NP-MWCNT conjugates and fluorinated POSS compounds (both as prepared in Example 1) using an application procedure substantially as outlined in Example 1.

FIGS. 18A-C are photographs of steel mesh #50 (FIG. 18A), steel mesh #70 (FIG. 18B) and steel mesh #90 (FIG. 18C), each with untreated surfaces. FIG. 18D is an SEM image of individual wires of a steel wire mesh with an untreated surface. FIG. 18E is an SEM image of the surface of a single wire of the individuals wire of the steel mesh of FIG. 18D.

FIG. 19A is an SEM image of a steel mesh surface modified with $SiO_2$ NP-MWCNT conjugates and fluorinated POSS compounds. FIG. 19B shows SEM images with 2 μm and 200 nm scale bars, respectively, showing modified steel mesh surfaces of FIG. 19A. FIG. 20A is a photograph showing water droplets on the modified steel mesh surface of FIG. 19A. FIG. 20B is a photograph showing a single water droplet of FIG. 20A having a measured contact angle of 160°.

FIG. 21 is a bar graph showing the influence of the mesh size on water contact angle. The graph more specifically shows water contact angles for untreated, POSS-only treated, and combination-treated (SiO$_2$ NP-MWCNT conjugates and fluorinated POSS compounds) steel mesh #50, steel mesh #70 and steel mesh #90. For each dataset, the untreated steel mesh is the left data bar, the POSS-only treated steel mesh is the middle data bar, and the combination-treated (SiO$_2$ NP-MWCNT conjugates and fluorinated POSS compounds) steel mesh is the right data bar. As can be seen, water contact angle increases with decreasing mesh size. Water contact angles also increase when the mesh is modified with the fluorinated POSS compounds, but the increase in water contact angle is noticeably greater when the mesh surface is treated with a combination of SiO$_2$ NP-MWCNT conjugates and fluorinated POSS compounds. Generally, both types of treated mesh surfaces appeared omniphobic and exhibited bouncing-drop phenomenon. However, when the same treatment is applied to a flat smooth steel plate, the contact angle is much lower. This set of experiments demonstrates the importance of surface contact geometric factors.

Figure 22:
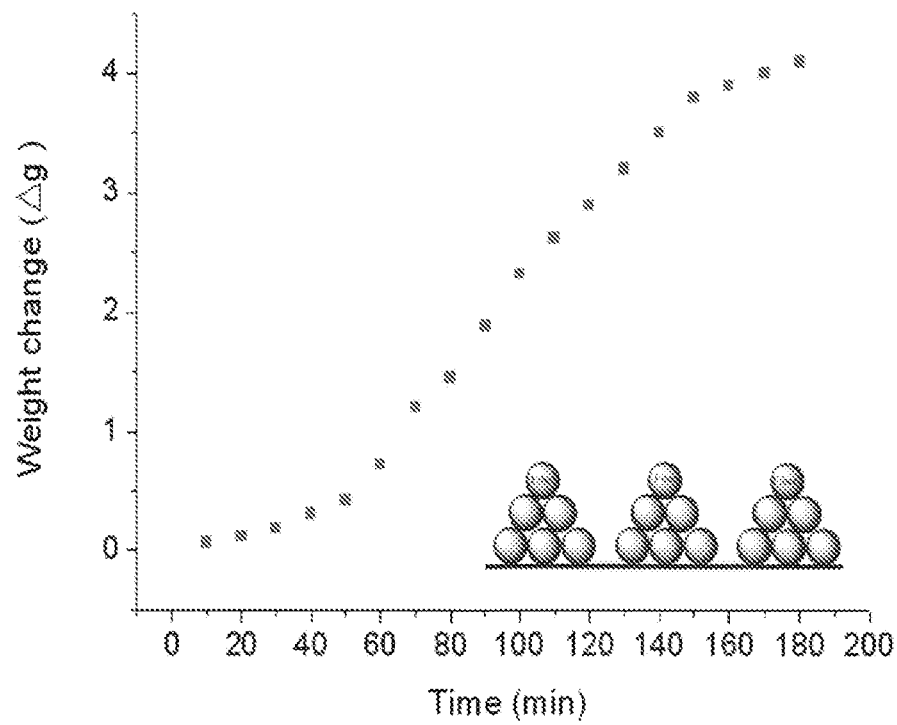
FIG. 22 is a graph showing ice accretion characteristics of stacked (shown schematically) untreated glass fibers.
Figure 23:
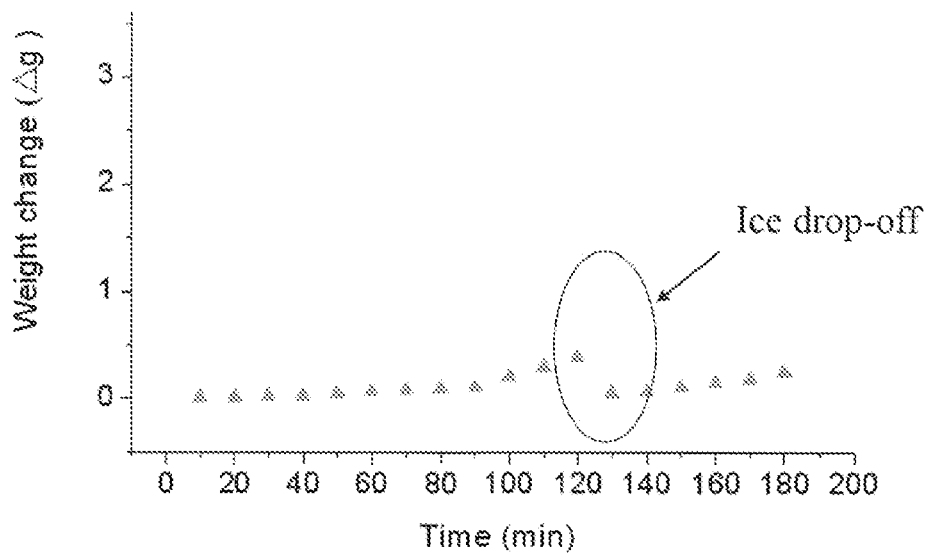
FIG. 23 is a graph showing ice accretion data for glass fibers treated with CNT-functionalized silica nanoparticles. The graph exhibits drop in weight change at about 125 minutes, indicating ice fell off the glass fibers.

Example 5—Fabrication of Icephobic Glass Fibers. In this example, glass fibers (1-10 mm diameters, 1 cm lengths) were treated with a combination of SiO$_2$ NP-MWCNT conjugates and fluorinated POSS compounds (both as prepared in Example 1) using an application procedure substantially as outlined in Example 1. The glass fibers and tubes were thoroughly cleaned using a silicon wafer cleaning process prior to modification with the SiO$_2$ NP-MWCNT conjugates and fluorinated POSS compounds. FIG. 22 is a graph showing ice accretion characteristics of stacked (shown schematically) untreated glass fibers. As shown in FIG. 22, untreated glass fibers exhibit a slight induction time before ice accretion starts to accelerate. FIG. 23 is a graph showing ice accretion data for glass fibers treated with CNT-grafted silica nanoparticles. The graph exhibits drop in weight change at about 125 minutes, indicating ice fell off the glass fibers. Clearly, the effectiveness of glass fibers modified with SiO$_2$ NP-MWCNT conjugates and fluorinated POSS compounds exhibit enhanced icephobicity as compared to untreated glass fibers. The ice accretion tests of FIGS. 22 and 23 were performed at −20° C.

Although the present invention and its objects, features and advantages have been described in detail, other embodiments are encompassed by the invention. Finally, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. An icephobic substrate comprising:
  a base substrate having a first surface with a disordered surface texture, the disordered surface comprising a plurality of multiscale watersheds; and
  an icephobic coating on the first surface of the base substrate, the icephobic coating comprising:
  nanoparticles on the disordered surface texture;
  carbon nanotubes bound to the nanoparticles; and
  fluorinated polyhedral oligomeric silsesquioxane (POSS) compounds located in and/or on the carbon nanotubes;
  wherein
  the icephobic substrate has a plurality of flowpaths for the movement of solids and/or liquids relative to the icephobic coating.

2. The icephobic substrate of claim 1, wherein the plurality of flowpaths facilitate movement of liquids relative to the icephobic coating at a rate sufficient to prevent conversion of the liquids to solids.

3. The icephobic substrate of claim 1, wherein the base substrate is made of a sheet of a non-porous material.

4. The icephobic substrate of claim 1, wherein the base substrate is made of any one of a metal mesh, an alloy mesh, a woven fiber, a non-woven fiber, a woven fabric, and a nonwoven fabric.

5. The icephobic substrate of claim 1, wherein the base substrate is made a glass, a ceramic, a metal, an alloy, a metal oxide, a plastic, a rubber, an animal-derived textile, a plant-derived textile, a synthetic textile, or any combination thereof.

6. The icephobic substrate of claim 1, wherein the base substrate is made a metal, an alloy, a metal oxide, or any combination thereof.

7. The icephobic substrate of claim 1, wherein the nanoparticles have diameters ranging from about 5 nm to about 250 nm.

8. The icephobic substrate of claim 1, wherein the nanoparticles have diameters ranging from about 5 nm to about 100 nm.

9. The icephobic substrate of claim 1, wherein the nanoparticles have diameters ranging from about 5 nm to about 20 nm.

10. The icephobic substrate of claim 1, wherein the nanoparticles are made of any one of a metal, a metal alloy, a metal oxide, a glass, a ceramic, and a polymer.

11. The icephobic substrate of claim 1, wherein the nanoparticles are silica nanoparticles.

12. The icephobic substrate of claim 1, wherein the carbon nanotubes are singlewalled carbon nanotubes.

13. The icephobic substrate of claim 1, wherein the carbon nanotubes are multiwalled carbon nanotubes.

14. The icephobic substrate of claim 1, wherein the carbon nanotubes have up to about 30 wt % of total impurities.

15. The icephobic substrate of claim 1, wherein the fluorinated POSS compounds have the chemical formula $[RSiO_{3/2}]_n$, where R is a fluorocarbon and n is 6, 8, 10 or 12.

16. The icephobic substrate of claim 15, wherein n is 8.

17. The icephobic substrate of claim 15 wherein R is any one of trifluoromethyl, perfluorododecyl, perfluorodecyl, perfluorotetradecyl, tridecafluoro-1,1, 2, 2-tetrahydrooctyl, 4-perfluorooctylphenyl, pentafluorophenyl, p-trifluoromethyltetrafluorophenyl, nonafluorohexyl, or heptdecafluoro-1, 1,2,2-tetrahydrodecyl.

18. The icephobic substrate of claim 1, further comprising a heating element coupled with a second surface of the base substrate.

19. The icephobic substrate of claim 18, wherein the heating element comprises one or more phase change materials.

20. The icephobic substrate of claim 19, wherein the one or more phase change materials are contained within microcapsules.

21. The icephobic substrate of claim 18, wherein the heating element comprises piezoelectric fibers.

22. The icephobic substrate of claim 18, wherein the heating element comprises a microsensor and/or an actuator.

23. The icephobic substrate of claim 18, further comprising an adhesive on a surface of the heating element.

24. The icephobic substrate of claim 1, further comprising a layer having electronic components, the layer coupled with a second surface of the base substrate.

25. The icephobic substrate of claim 24, further comprising an adhesive on a surface of the layer.

26. The icephobic substrate of claim 1, further comprising an adhesive on a second surface of the base substrate.

27. The icephobic substrate of claim 1, further comprising a protective polymeric film on the icephobic coating.

28. An icephobic substrate comprising:
a base substrate; and
an icephobic coating on a first surface of the base substrate, the icephobic coating comprising:
nanoparticles on the first surface of the substrate;
carbon nanotubes bound to the nanoparticles; and
fluorinated polyhedral oligomeric silsesquioxane (POSS) compounds located in and/or on the carbon nanotubes, the fluorinated POSS compounds having the chemical formula $[RSiO_{3/2}]_n$, where R is a fluorocarbon and n is 6, 8, 10 or 12,
wherein the icephobic substrate has a plurality of flow-paths for the movement of solids and/or liquids relative to the icephobic coating.

29. An icephobic substrate comprising:
a base substrate;
an icephobic coating on a first surface of the base substrate, the icephobic coating comprising:
nanoparticles on the first surface of the substrate;
carbon nanotubes bound to the nanoparticles; and
fluorinated polyhedral oligomeric silsesquioxane (POSS) compounds located in and/or on the carbon nanotubes; and
a layer comprising electronic components coupled with a second surface of the base substrate,
wherein the icephobic substrate has a plurality of flow-paths for the movement of solids and/or liquids relative to the icephobic coating.

* * * * *